(12) United States Patent
Chen et al.

(10) Patent No.: US 11,567,677 B2
(45) Date of Patent: **\*Jan. 31, 2023**

(54) FLEXIBLE DEPROVISIONING OF DISTRIBUTED STORAGE

(71) Applicant: Red Hat, Inc., Raleigh, NC (US)

(72) Inventors: Huamin Chen, Westford, MA (US); Steven Travis Nielsen, Bothell, WA (US); Sage Austin Weil, Madison, WI (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/575,869

(22) Filed: Jan. 14, 2022

(65) Prior Publication Data

US 2022/0137839 A1 May 5, 2022

Related U.S. Application Data

(63) Continuation of application No. 16/989,245, filed on Aug. 10, 2020, now Pat. No. 11,226,750, which is a continuation of application No. 16/028,059, filed on Jul. 5, 2018, now Pat. No. 10,740,009.

(51) Int. Cl.
  *G06F 3/06* (2006.01)

(52) U.S. Cl.
  CPC ............ *G06F 3/0626* (2013.01); *G06F 3/061* (2013.01); *G06F 3/0607* (2013.01); *G06F 3/067* (2013.01); *G06F 3/0629* (2013.01)

(58) Field of Classification Search
  CPC ...... G06F 3/0607; G06F 3/061; G06F 3/0626; G06F 3/0629; G06F 3/067

USPC ....................................................... 711/114
See application file for complete search history.

(56) References Cited

U.S. PATENT DOCUMENTS

| 9,569,476 | B2 | 2/2017 | Dejana et al. |
| 10,120,582 | B1 | 11/2018 | Farhan et al. |
| 2013/0297907 | A1 | 11/2013 | Ki et al. |

OTHER PUBLICATIONS

The best cloud native storage for containerized applications; portworx; retrieved May 28, 2018; https://portworx.com/wp-content/uploads/2018/05/Portworx-overview-5-24-18; 2 pages.

(Continued)

*Primary Examiner* — Reginald G Bragdon
*Assistant Examiner* — Aaron D Ho
(74) *Attorney, Agent, or Firm* — K&L Gates LLP

(57) ABSTRACT

Flexible deprovisioning of distributed storage is disclosed. For example, an orchestrator executes on a processor to measure a current storage demand factor based on a current count of service guests and a storage capacity of a plurality of storage nodes. A projected storage demand factor is calculated by (i) adjusting the current count of service guests with a timing factor resulting in a projected count, and (ii) combining the projected count with a storage class associated with the service guests. The orchestrator determines that the projected storage demand factor is lower than the current storage demand factor, and in response requests termination of a first storage node of the plurality of storage nodes based on the first storage node lacking an active communication session with the service guests. Cancel termination of the first storage node based on an association between the first storage node and a second storage node.

20 Claims, 7 Drawing Sheets

(56) References Cited

OTHER PUBLICATIONS

Cloud containers race heats up between Amazon and Google; retrieved May 28, 2018; https://searchcloudcomputing.techtarget.com/news/4500272538/Cloud-containers-race-heats-up-between-Amazon-and-Google (pp. 1-8).
Suspending and Resuming Scaling Processes—Amazon EC2 Auto Scaling; retrieved May 28, 2018; https://docs.aws.amazon.com/autoscaling/ec2/userguide/as-suspend-resume-processes.html; pp. 1-20.
Horizontal Pod Autoscaler—Kubernetes; retrieved May 28, 2018; https://kubernetes.io/docs/tasks/run-application/horizontal-pod-autoscale/; pp. 1-8.
Vertical Pod Authoscaler; kubernetes/autoscaler; GitHub; retrieved May 29, 2018; https://github.com/kubernetes/autoscaler/tree/master/vertical-pod-autoscaler; pp. 1-4.
Rajesh R V, Spring 5.0 Microservices, Understanding Autoscaling, 331 (2nd ed. 2017); retrieved Jun. 21, 2018; https://books.google.co.in/books?id=CedDDwAAQBAJ&pg=PA331&lpg=PA331&dq=autoscaling+storage+using+seasonality+or+time+of+day&source=bl&ots=dhp_kC5-OB&sig=Gu6tT_S0FL_MNbemo_Y04lzGpG0&hl=en&sa=X&ved=0ahUKEwjBg4y37K_bAhWMbisKHevhAHoQ6AEILzAB#v=onepage&q=autoscaling%20storage%20using%20seasonality%20or%20time%20of%20day&f=false; 4 pages.
Prashant Gaharwar. Dynamic storage provisioning with SLO guarantees. Master's thesis, University of Waterloo, 2010. (Year: 2010).
Frey, S., Disch, S., Reich, C., Knahl, M. and Clarke, N. (2015) Cloud Storage Prediction with Neural Networks. Proceedings of the Sixth International Conference on Cloud Computing, GRIDs, and Virtualization, Nice, Mar. 22-27, 2015, 68-72. (Year: 2015).
Bryk, P., Malawski, M., Juve, G. et al. Storage-aware Algorithms for Scheduling of Workflow Ensembles in Clouds. J Grid Computing 14, 359-378 (2016). https://doi.org/10.1007/s 10723-015-9355-6 (Year: 2016).
P. Grigoras, M. Tottenham, X. Niu, J. G. F. Coutinho and W. Luk, "Elastic Management of Reconfigurable Accelerators," 2014 IEEE International Symposium on Parallel and Distributed Processing with Applications, Milan, 2014, pp. 174-181. (Year: 2014).

FLEXIBLE DEPROVISIONING OF DISTRIBUTED STORAGE

CROSS REFERENCES TO RELATED APPLICATIONS

This application is a continuation U.S. patent application Ser. No. 16/989,245, filed on Aug. 10, 2020, which is a continuation of U.S. patent application Ser. No. 16/028,059, filed Jul. 5, 2018, now U.S. Pat. No. 10,740,009, issued on Aug. 11, 2020, the entire contents of which are hereby incorporated by reference.

BACKGROUND

The present disclosure generally relates to shared computing environments such as multi-tenant cloud environments. Specifically, shared computing environments, whether public or privately implemented within an organization, typically employ orchestration of the deployment of isolated guests that perform the computing tasks in the networked computer systems. In computer systems, it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests enable a programmer to quickly scale the deployment of applications to the volume of traffic requesting the applications, and may be deployed in a variety of hardware environments. Multiple guests may also be clustered together to perform a more complex function than the respective containers are capable of performing individually. Many applications require persistent storage to store a current execution state and therefore persistent storage may be provisioned and allocated to the guests executing in a computing environment.

SUMMARY

The present disclosure provides a new and innovative system, methods and apparatus for flexibly deprovisioning distributed storage. In an example, an orchestrator including a storage controller managing a first plurality of storage nodes and a guest scheduler executes on one or more processors. A current storage demand factor is measured based on a current count of a first plurality of service guests and a storage capacity of the first plurality of storage nodes. A projected storage demand factor is calculated by (i) adjusting the current count of the first plurality of service guests with at least a first timing factor resulting in a projected count, and (ii) combining the projected count with at least a first storage class associated with the first plurality of service guests. The orchestrator determines that the projected storage demand factor is lower than the current storage demand factor. Responsive to determining that the projected storage demand factor is lower than the current storage demand factor, termination of a first storage node of the first plurality of storage nodes is requested, where the first storage node is selected for termination based on the first storage node lacking an active communication session with any service guest of the first plurality of service guests. Termination of the first storage node is canceled based on an association between the first storage node and a second storage node.

Additional features and advantages of the disclosed method and apparatus are described in, and will be apparent from, the following Detailed Description and the Figures.

DETAILED DESCRIPTION OF EXAMPLE EMBODIMENTS

Figure 1:
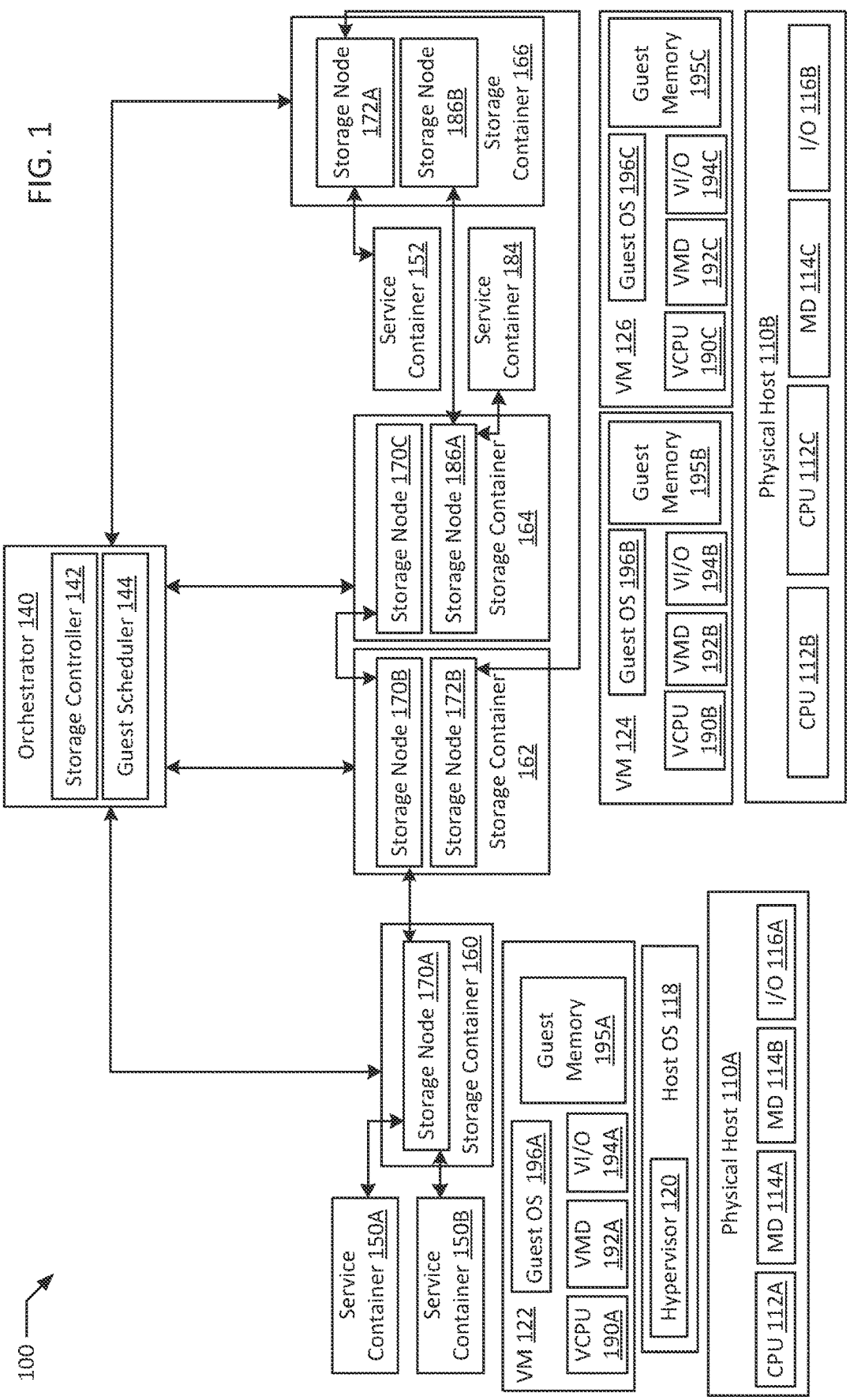
FIG. 1 is a block diagram of a flexible deprovisioning of distributed storage system according to an example of the present disclosure.

In computer systems, virtualization may be implemented to allow for flexible scaling of computing resources, for example, in a multi-tenant cloud environment. In an example, a virtual machine ("VM") may be a robust simulation of an actual physical computer system utilizing a hypervisor to allocate physical resources to the virtual machine. In some examples, a container based virtualization system, for example, one managed by a container manager such as Red Hat® OpenShift® executing a containerization runtime environment such as Docker® may be advantageous, as container based virtualization systems may be lighter weight than systems using virtual machines with hypervisors. In the case of containers, a container will often be hosted on a physical host or virtual machine that already has an operating system executing, and the container may be hosted on the operating system of the physical host or VM. In large scale implementations, container schedulers, such as those included in container orchestrators (e.g., Red Hat® OpenShift®, Kubernetes®), generally respond to frequent container startups and cleanups with low latency. Containers may enable wide spread, parallel deployment of computing power for specific tasks. In a typical example, a container may be instantiated to process a specific task and reaped after the task is complete.

Many network applications, such as those hosted on containers in multi-tenant clouds, may require the saving of an execution state for a particular user accessing the application. For example, an online game may require the saving of game progress; an e-commerce site may require the saving of payment information and shopping carts; and a social media site may require the saving of interactions with a given post. Many applications may save data in the background for future interactions, for example, customizable interface settings and display preferences. Where settings and/or data require long term storage so that the data is available in future sessions of the application, storage that persists past the termination of a container executing the application may be required. Such applications may typically be referred to as stateful, in contrast to stateless applications where each interaction with the application is effectively independent of a subsequent interaction (e.g., web search, voice over internet protocol, video conferencing). In a typical example, such persistent storage may store data in devices such as hard drive disks ("HDD"), solid state drives ("SSD"), and/or persistent memory (e.g., Non-Volatile Dual In-line Memory Module ("NVDIMM")).

In a typical example, dedicated storage units may be connected to a network with hosts hosting containers executing stateful applications to store the execution states of these applications. In an example, the dedicated storage units may be in the form of Network Attached Storage ("NAS") and/or Storage Area Networks ("SAN"). Both NAS and SAN systems typically include replication of data to prevent against data loss due to a failure in any one device. This replication may be implemented through a redundant array of independent disks ("RAID") setup. RAID arrays may be designed to increase performance, to provide live data backup, or a combination of both. A RAID array may be configured to increase storage throughput, for example, where a logical storage volume is physically hosted on multiple devices. In an illustrative example, storage throughput may be increased by simultaneously executing a storage operation on two separate disks in a RAID array, effectively doubling the speed at which the file may be written to persistent storage. For example, half of the file is written to the first disk and the other half to the second disk, thereby allowing the write speed of both disks to be used simultaneously. When the file is read, the read speed of both disks is also available for faster retrieval. In a RAID array designed for data security through replication, each piece of data on a given storage device may be saved at least in duplicate across at least two physical devices so that if one device fails, the data on that device may be reconstructed from the remaining copies.

A notable disadvantage of NAS and SAN systems, however, is that an initial access of data across a network is typically orders of magnitude slower than accessing storage locally located on the same physical device as an application server. While the time lost starting any data operation may be inconsequential compared to the transfer time of a large file, for a small file, this initial startup cost may take significantly longer than the entire storage operation. Therefore, especially for systems with high performance requirements where microseconds of latency are significant, centralized storage options like NAS and SAN systems may represent a performance bottleneck. In addition, a given storage node may be compatible with only certain operating systems further reducing deployment flexibility.

A software alternative to physical NAS and SAN systems is distributed file systems such as GlusterFS®. With a distributed file system, artificial storage volumes may be configured from a pool of storage space networked together over a networking protocol such as transmission control protocol/internet protocol ("TCP/IP"). In typical implementations, these pooled storage volumes may experience some performance bottlenecks that do not apply to NAS or SAN systems deployed on dedicated storage hardware. For example, since GlusterFS® can assemble logical storage units from disparate physical hardware, additional network latency delays may be added to data storage, retrieval, replication, and other operations. While there is also additional latency accessing network storage in general as compared to local storage on the same physical hardware as the application accessing the storage, the various physical storage units within a NAS or SAN device are typically in the same physical hardware node providing a given logical storage node, while a logical storage node in a distributed file system may be spread across many different physical hosts. The additional network latency between different physical devices providing the logical storage unit may be detrimental to many computing tasks. Distributed file systems do, however, enable the creation of massive storage arrays (e.g., in the petabyte range) from excess capacity on commoditized hardware. A significant advantage, however of distributed file systems is scalability and ease of deployment especially in an environment like a multi-tenant cloud, and the added efficiency of being able to utilize unused storage space on various physical hardware nodes in the cloud environment to provide storage for other services hosted in the cloud. Typically, creation of a distributed file system storage network would require elevated rights and different utilities from, for example, container orchestration. Therefore, when scaling an application through rapid deployment of service containers executing the application, the storage for those containers may not scale with the rollout of the service containers.

Distributed file systems may be configured to be deployed in virtualized form. For example, a storage guest (e.g., container or VM) may be configured to add unused physical storage capacity from a server in a multi-tenant cloud to a distributed storage node, providing a low latency access point for data storage for guests executing applications and services on the same physical hardware, while also enabling replication of the data to other nodes of the distributed file system over a network, albeit with potentially decreased replication performance. While virtualizing storage guests provides an efficient solution for scaling up storage nodes on demand, when storage demand drops, the interconnectivity between various storage nodes that increases storage efficiency and utilization in distributed file systems also results in an interlocking web of interdependent nodes that prevents scaling down storage clusters from being as straight forward as scaling down compute resources for a service (e.g., by shutting down service guests). For example, just because service guest A connected to storage node A on storage guest A is shut down, does not mean that storage node A or storage guest A is no longer used (either directly by another service guest B, or indirectly as a replication node of storage node B). Therefore, an orchestrator responsible for scaling compute resources to match usage demand by end users may often times be unable to similarly scale distributed storage node capacity.

The present disclosure aims to address downscaling and deprovisioning issues in network storage nodes, including typical dedicated storage solutions, distributed file system storage, as well as storage nodes deployed with a combination of dedicated and distributed storage. Prior to attempting to deprovision storage, a deprovisioning opportunity may typically need to be identified to trigger a deprovisioning process. Flexible deprovisioning of distributed storage may be implemented to take measurable storage usage characteristics and combine these with various demand factors including timing factors, for example, based on historical usage patterns and/or configured usage patterns to compute a projected storage demand factor. Upon identifying that projected storage demand is less than current storage demand, storage nodes and/or guest may be identified for deprovisioning, for example, based on active network connections between these storage nodes and various executing service delivery guests. Projected usage may additionally be computed at various granularities, for example, different tenants of a multi-tenant cloud or different application types may have significantly different usage patterns for storage. After a storage node and/or storage guest is identified for deprovisioning, a validation procedure is implemented to ensure that deprovisioning the identified node and/or guest does not cause negative consequences for any other system in the cloud environment, including systems of unrelated users or tenants. Where an identified storage node or guest is further identified to be a shared storage resource actively in use, instead of shutting down the identified node or guest, alternative deprovisioning methods may be implemented, for example, reducing performance settings or migrating a storage node or guest prior to termination may be employed. Therefore, storage capacity may be effectively scaled to match compute usage resulting in improved computing efficiency, energy efficiency, and higher guest density on physical computing hardware.

FIG. 1 is a block diagram of a flexible deprovisioning of distributed storage system according to an example of the present disclosure. The system 100 may include one or more physical host(s) 110A-B. Physical hosts 110A-B may in turn include one or more physical processor(s) (e.g., CPUs 112A-C) communicatively coupled to memory device(s) (e.g., MD 114A-C) and input/output device(s) (e.g., I/O 116A-B). As used herein, physical processor or processors 112A-C refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-C refers to volatile or non-volatile memory devices, such as RAM, ROM, EEPROM, or any other device capable of storing data. In an example, memory devices 114A-C may be persistent storage devices such as hard drive disks ("HDD"), solid state drives ("SSD"), and/or persistent memory (e.g., Non-Volatile Dual In-line Memory Module ("NVDIMM")). Memory devices 114A-C may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116A-B refer to devices capable of providing an interface between one or more processor pins and an external device, the operation of which is based on the processor inputting and/or outputting binary data. CPU(s) 112A-C may be interconnected using a variety of techniques, ranging from a point-to-point processor interconnect, to a system area network, such as an Ethernet-based network. Local connections within physical hosts 110A-B, including the connections between processors 112A-C and memory devices 114A-C and between processors 112A-C and I/O device 116A-B may be provided by one or more local buses of suitable architecture, for example, peripheral component interconnect (PCI).

In an example, physical host 110A may run one or more isolated guests, for example, VM 122, which may in turn host additional virtual environments (e.g., VMs and/or containers). In an example, a container (e.g., storage containers 160, 162, 164, 166, service containers 150A-B, 152, 184) may be an isolated guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Storage container 160 and/or service containers 150A-B may run directly on a host operating system (e.g., host OS 118) or run within another layer of virtualization, for example, in a virtual machine (e.g., VM 122). In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, VM 122 may be a VM executing on physical host 110A.

System 100 may run one or more VMs (e.g., VMs 122), by executing a software layer (e.g., hypervisor 120) above the hardware and below the VM 122, as schematically shown in FIG. 1. In an example, the hypervisor 120 may be a component of respective host operating system 118 executed on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to VM 122 as devices, including virtual central processing unit ("VCPU") 190A, virtual memory devices ("VIVID") 192A, virtual input/output ("VI/O") device 194A, and/or guest memory 195A. In an example, another virtual guest (e.g., a VM or container) may execute directly on host OSs 118 without an intervening layer of virtualization.

In an example, a VM 122 may be a virtual machine and may execute a guest operating system 196A which may utilize the underlying VCPU 190A, VIVID 192A, and VI/O 194A. Processor virtualization may be implemented by the hypervisor 120 scheduling time slots on physical processors 112A such that from the guest operating system's perspective those time slots are scheduled on a virtual processor 190A. VM 122 may run on any type of dependent, independent, compatible, and/or incompatible applications on the underlying hardware and host operating system 118. The hypervisor 120 may manage memory for the host operating system 118 as well as memory allocated to the VM 122 and guest operating system 196A such as guest memory 195A provided to guest OS 196A.

In an example, VMs 124 and 126 may be similar virtualization implementations to VM 122, but may, for example, execute separate operating systems (e.g., guest OS 196B-C). In an example, guest OSses 196BC may be incompatible with guest OS 196A and/or host OS 118. In an example, VMs 124 and 126 execute on physical host 110B, with VCPU 190B-C, VMD 192B-C, VI/O 194B-C, and guest memory 195B-C virtualizing access to physical CPU 112B-C, MD 114C, and I/O 116B. In an example, storage containers 162, 164, 166, and/or service containers 152, 184 are hosted on a VM (e.g., VMs 124 or 126). In the example, storage containers 162, 164, 166, and/or service containers 152, 184 are implemented similarly to storage container 160 and/or service containers 150A-B. In an example, orchestrator 140 may be hosted on one or more guests, for example, a service container similar to service containers 150A-B, 152, 184, and orchestrator 140 may be a virtualization orchestrator (e.g., Red Hat® OpenShift®, Kubernetes®) managing virtual compute resources for system 100. For example, orchestrator 140 may include guest scheduler 144 for containers and/or VMs, network storage management (e.g., storage controller 142), API management etc. In an example, orchestrator 140 is implemented via a cluster of containers instead of in a single container. In an example, storage controller 142 may be a storage cluster orchestrator (e.g., Rook®) managing the deployment of a distributed storage solution (e.g., Red Hat® Ceph®, OpenStack® Swift, Amazon S3®, etc.) that may additionally employ a distributed file system (e.g., Red Hat® GlusterFS®). In an example, storage controller 142 and/or guest scheduler 144 may be component parts of orchestrator 140. In another example, storage controller 142 and/or guest scheduler 144 may be external components in communication with orchestrator 140, for example, through an application programming interface ("API"). In an example, any form of suitable network for enabling communications between computing devices, for example, a public network (e.g., the Internet), a private network (e.g., a local area network (LAN) or wide area network (WAN)), or a combination thereof may be employed to connect the component parts of the system (e.g., orchestrator 140, storage containers 160, 162, 164, 166, service containers 150A-B, 152, 184) to each other. In an example, orchestrator 140, storage controller 142, and/or guest scheduler 144 may be implemented via any suitable form of computing module (e.g., application, executable, script, hardware module, etc.).

In an example, in addition to distributed storage provided by storage containers 160, 162, 164, and 166, storage controller 142 may additionally manage storage in dedicated storage nodes (e.g., NAS, SAN, etc.). In an example, storage controller 142 may deploy storage in large logical units with preconfigured performance characteristics (e.g., storage nodes 170A-C, 172A-B, 186A-B). In an example, access to a given storage node (e.g., storage nodes 170A-C, 172A-B, or 186A-B) may be controlled on an account and/or tenant level. In an example, a service container (e.g., service containers 150A-B, 152, or 184) may require persistent storage for application data, and may request persistent storage with a persistent storage claim to orchestrator 140. In the example, storage controller 142 may allocate storage to service containers 150A-B, 152, or 184 through a storage node (e.g., storage nodes 170A-C, 172A-B, or 186A-B) in the form of a persistent storage volume. In an example, a persistent storage volume for service containers 150A-B, 152, or 184 may be allocated a portion of the storage capacity and throughput capacity of a given storage node (e.g., storage nodes 170A-C, 172A-B, or 186A-B).

In an example, a storage node (e.g., storage nodes 170A-C, 172A-B, or 186A-B) may be deployed to one or more hosts (e.g., storage containers 160, 162, 164, 166, any dedicated NAS or SAN hosts, etc.). Storage nodes may be preferentially implemented with RAID type functionality to increase throughput and/or data security (e.g., through replication). For example, a typical RAID implementation may include numerous storage devices such as HDDs and SSDs that may be arranged in a RAID array to prevent against the failure of any one storage device. For example, a storage node with three physical devices arranged in a RAID array may be configured to store two full copies of each data item in the RAID array across the three storage devices such that failure of any one HDD can be recovered from by replacing that HDD and recreating the data on it from the other two storage devices. A common RAID implementation for a storage node may be what is known as RAID 5 or RAID 6, where an "exclusive or" calculation is used to back up each bit stored to an array. In a RAID 5 example, a parity bit may be stored one drive in the array, the parity bit calculated based on the corresponding bits to the parity bit in the same physical location on the other drives of the array. Data is typically stored in binary form, where every bit is either a 0 or a 1. In a simplified example for visualization purposes, storage device 1 may store a 1, and storage device 2 may store a 0. In the example, because the data in storage device 1 and storage device 2 is different, a 1 is stored on storage device 3. Therefore if storage device 2 fails, you can calculate that since you know that storage device 1 had different data from storage device 2 due to the 1 stored on storage device 3, storage device 2 must have had a 0. Therefore the data on storage device 2 can be recreated if storage device 2 fails and requires replacement. Since the order of the storage devices is known, one storage device can always store the result of a chain of exclusive or operations and therefore only the effective capacity of one storage device needs to be used to store a "backup" of every other corresponding bit on the other drives. A 3 storage device RAID 5 array then results in a 33% replication overhead, while a 5 storage device RAID 5 array only requires 1 of the 5 storage devices' capacity to be lost resulting in 20% replication overhead. However, as arrays increase in size, storing a second parity bit may be advantageous to guard against the possibility of losing a second storage device to failure before the data in the failed first device is reconstructed, at the cost of another storage device worth of overhead on the array. Otherwise, the loss of two devices would defeat the "exclusive or" calculations for determining what data was on the failed devices. In a SAN system, replication may further be performed over a network with another SAN node, such that data is secure from the loss of not just a physical device but potentially from the loss of an entire data center.

In storage implementations including converged, distributed, local storage nodes (e.g., container native storage), a RAID-like implementation may be deployed with a combination of virtual storage devices (e.g., storage nodes) hosted in storage hosts (e.g., storage containers 160, 162, 165, 166, and/or VMs or physical hosts hosting storage nodes). In various examples, storage nodes may be implemented with replication and/or throughput increasing configurations across multiple storage hosts, both virtual and physical. For example, in many instances, replication may be implemented on a remote physical host because a latency penalty of 5-15 ms may typically be acceptable for replication purposes. With cloud environments, if a service guest (e.g., service container 152) and/or storage host (e.g., storage container 166) crashes, and service guest's data was replicated to a remote storage node (e.g., on a storage guest on physical host 110A), orchestrator 140 may additionally elect to reinstantiate the failed service guest local to the replication node based on then available compute capacity. In an example a storage node deployed to a single host may have replication implemented on a separate host inaccessible to the services utilizing the storage of the storage node. For example, a first tenant's data may be replicated to a storage node or storage guest hosting a different tenant's data, especially where the first tenant is not permitted to directly access its replicated data. This allows storage controller 142 to increase effective storage utilization without deploying additional dedicated storage. In an example, physical compute and/or storage capacity may be held in reserve to protect against spikes in usage demand. In an example, a storage node may be deployed across multiple storage hosts in a distributed storage system (e.g., storage node 170A-C deployed on storage containers 160, 162, 164). For example, storage container 160 may provide high performance, highly converged, physically collocated storage to service containers 150A-B on shared host VM 122 and/or physical host 110A. In an example, storage node 170A may be configured with a high performance storage class (e.g., high throughput, low latency, multiply replicated and redundant). In the example, storage nodes 170B and 170C may be linked with storage node 170A. For example, storage nodes 170A-C may be connected as one large distributed storage volume implementing compression and/or replication (e.g., RAID 1, RAID 5, RAID 6). In an example, storage nodes 170B-C may be configured with the same high performance storage class as storage node 170A, or with a lower performance storage class (e.g., less storage I/O throughput, less capacity, etc.) In an example, storage classes allow storage nodes and/or storage guests to be configured with stratified performance tiers that are dynamically adjustable based on storage demand. For example, a full replication of storage node 170A may be split between storage nodes 170B and 170C.

In an example, a persistent storage volume created in storage node 170A by service container 150A is replicated to storage node 170B. In an example, service container 150A may only maintain an active network connection to storage container 160 and storage node 170A, with no direct active communication sessions maintained with storage nodes 170B-C. In an example, service containers 150A-B may host a video game application whose usage drops between the hours of 2 AM and 3 PM (e.g., after bed time for gamers and before school is out). In the example, service container 150B may be a second instance of service container 150A that is shut down during low usage times of day. In the example, when service container 150B is shut down, storage node 170A may require less throughput and/or less capacity. In the example, storage node 170A may be reconfigured to a lower performance storage class when service container 150B is not executing. For example, storage node 170A may be configured to a storage class with lower throughput, resulting in additional storage 10 throughput that may be dedicated to another storage node on storage container 160. In an example, storage node 170A may be reconfigured for backups to go to, for example, a central storage repository rather than replicating to storage nodes 170B-C. In an example, during very low usage, both service containers 150A and 150B may be terminated resulting in no active communication sessions from service containers to storage node 170A. In such circumstances, storage node 170A and/or storage container 160 may be identified for reclamation. In an example, if storage node 170A and/or storage container 160 is being actively used to replicate data from a different storage node, a termination request for storage node 170A and/or storage container 160 may be cancelled based on such activity. In an example, storage nodes connected to storage node 170A (e.g., storage nodes 170B-C) may be reconfigured to exclude storage node 170A from their replication configurations to allow storage node 170A to be terminated. For example, without service containers 150A-B executing, storage nodes 170B-C may have sufficient capacity and/or throughput to manage any other service containers executing the video game, such that removing the capacity of storage node 170A fails to significantly impact the performance of then executing copies of the video game service. In an example, the contents of storage node 170A may be transitioned to, for example, a NAS server and the transitioned storage node 170A may be reconfigured as a low performance storage class dedicated to replicating data from storage nodes 170B-C. In an example, data in storage node 170A may be kept in physical memory (e.g., MD 114A-B) on physical host 110A, pending reinstantiation of service containers 150A-B at a later time. In an example, storage node 170A and/or storage container 160 may be logically shut down while the data is stored pending renewed access. In such an example, physical storage capacity may continue to be utilized by the archived copy of storage node 170A, but orchestrator 140 and storage controller 142 may reallocate the storage throughput and network throughput previously allocated to storage container 160 and/or storage node 170A to new uses, for example, a new cluster of service and/or storage containers for a tenant whose applications see high usage in the morning such as a news site. In an example, archived data may be compressed to reduce capacity utilization, even where an application is configured to not use compression during execution to preserve high performance.

In an example, orchestrator 140 and/or storage controller 142 may be implemented to manage different levels of a computing environment. For example, orchestrator 140 may manage guest deployment for a multi-tenant cloud across a data center, or even a larger geographical region. Alternatively, orchestrator 140 may only manage deployments for a specific tenant in the cloud. As environments get larger, distributing orchestration of guests may provide for lower latency guest deployment. However, as an example, an orchestrator for one tenant may falsely identify resources such as storage nodes or storage containers for reclamation when those resources are still actively used by other tenants. Therefore validation before termination may be required. Validation may be achieved through verification with a higher level, more authoritative system (e.g., a cloud wide registry or orchestrator), and may also be performed by querying the resource slated for termination. In an example, service containers 150A-B and 152 are service containers of the video game service discussed above, while service container 184 is operated by a different tenant. If orchestrator 140 and/or storage controller 142 only controls orchestration for the video game tenant, a termination of service container 152 may be a trigger for storage controller 142 to deprovision and/or terminate storage node 172A and/or storage container 166. In the example, storage container 166 may respond that it also hosts storage node 186B and therefore should not be terminated. In an example, storage node 172A may simultaneously replicate data to and from storage node 172B, and storage node 172B may still be actively in use. In the example, storage node 172A may not be terminable without impacting service containers connected to storage node 172B, but, with the termination of service container 152, storage node 172A may be executing only as a replication node without direct connections to any service container. Therefore storage node 172A may be reconfigured to a lower storage class with, for example, less network upload bandwidth. In an example, storage node 172A's storage class may be downgraded even if a tenant of service container 152 configures its storage nodes for higher performance storage classes than the downgraded storage class, for example, due to the lack of direct application connections. In an example, storage controller 142 may downgrade the storage class of storage nodes based on historical usage.

Figure 2:
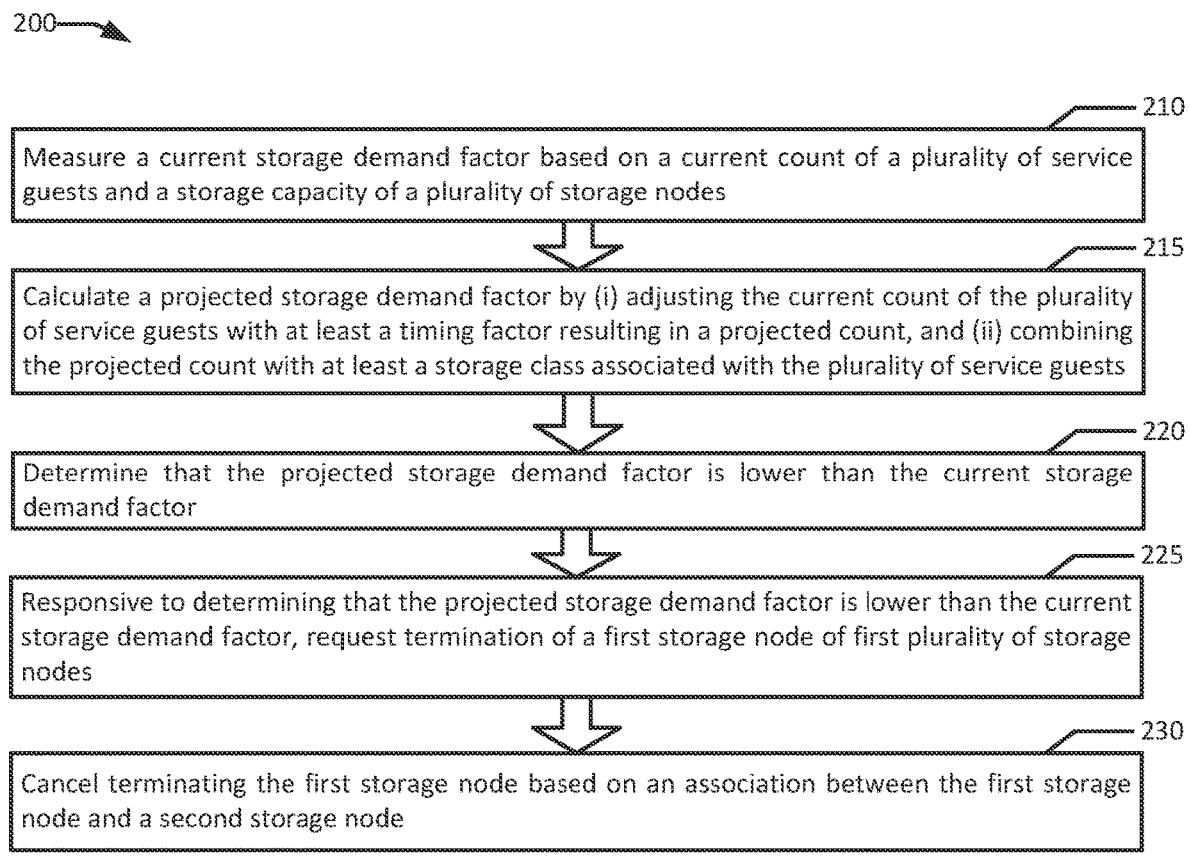
FIG. 2 is flowchart illustrating an example of cancelling storage deprovisioning in a flexible deprovisioning of distributed storage system according to an example of the present disclosure.

FIG. 2 is flowchart illustrating an example of cancelling storage deprovisioning in a flexible deprovisioning of distributed storage system according to an example of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both. In an example, the method 200 is performed by an orchestrator 140.

Example method 200 may begin measuring a current storage demand factor based on a current count of a first plurality of service guests and a storage capacity of a first plurality of storage nodes (block 205). For example, orchestrator 140 may maintain a count of service containers of a first tenant (e.g., the video game tenant of service guests 150A-B and 152). In the example, storage controller 142 may monitor and/or maintain records of the storage capacity of storage nodes 170A-C and 172A-B associated with the service containers 150A-B and 152. For example, storage controller 142 may maintain records of the allocated capacities of storage nodes 170A-C and 172A-B and may periodically query for a current utilization of that storage capacity. In an example, storage controller 142 may maintain historical records of minimum, average, and/or maximum storage capacity (or any other storage related throughput measurement) of other iterations of service containers 150A-B and 152. In an example, a current storage demand factor for the video game tenant may be computed based on the currently deployed storage capacity of storage nodes 170A-C and 172A-B as well as the current deployed computing capacity of the video game tenant (e.g., service containers 150A-B, 152). In an example, orchestrator 140 and/or storage controller 142 may schedule and/or monitor the deployment of distributed computing guests across multiple tenants, data centers, and/or geographical regions. For example, orchestrator 140 and/or storage controller 142 may have access to historical storage utilization data collected for multiple tenants. In addition, orchestrator 140 and/or storage controller 142 may have access to storage utilization data across geographical regions and time zones collected by other orchestrators and/or storage controllers managing other respective regions.

In an example, orchestrator 140 and/or storage controller 142 generates and/or maintains a list of active communication sessions between a plurality of service guests managed by orchestrator 140 (e.g., service containers 150A-B, 152 for the video game tenant) and storage nodes connected to and accessed by those service containers (e.g., storage nodes 170A-C, 172A-B). For example, orchestrator 140 and/or storage controller 142 may track persistent volume claims from service guests instantiated for a given tenant. In an example, a service guest and/or storage node may register active communication sessions with storage controller 142. In an example, storage nodes configured for the video game tenant may be deployed as distributed container native storage on storage guests (e.g., storage containers 160, 162, 164, and 166). In an example, a storage node may be configured to span multiple storage hosts, uniting physical storage on the various hosts into one logical storage volume. For example, storage nodes 170A-C may be one logical storage unit that may be accessed through any of storage containers 160, 162, and 164. In an example, multiple storage nodes may be configured in one storage guest (e.g., storage nodes 170B and 172B on storage container 162). In an example, storage performance configurations may be configured on a per storage node as well as a per storage guest basis. In an example, multiple storage nodes may be associated with each other without merging storage capacity (e.g., presenting storage nodes 170A-C as one unified logical storage volume with a combined storage capacity). For example, storage node 170B may be a backup node for data written to storage node 170A and/or storage node 170C, without adding any extra storage capacity to the exposed logical storage capacity of storage node 170A or 170C. In such an example, storage container 162 may be deployed with a low performance or backup storage class and solely host backup storage nodes for data replication and disaster recovery. For example, storage node 170B may be a backup repository for both high performance storage class storage nodes 170A and 170C, while storage node 172B may be a backup repository for storage node 172A. In an example, storage nodes 170B and 170C may be configured as a combined volume to increase data throughput (e.g., RAID 0) with minimal latency penalties since they are hosted on the same VM 124 and physical host 110B.

In an example, storage controller 142 has privileges to gather current storage capacity utilization metrics, for example, through orchestrator 140, storage containers 160, 162, 164, 166, and/or storage nodes 170A-C, 172A-B, 186A-B. In such examples, storage controller 142 may have privileged access to retrieve lists of active computing nodes (e.g., VMs 122, 124, 126, physical hosts 110A-B) in system 100. Storage controller 142 may additionally have access to retrieve lists of service guests (e.g., service containers 150A-B, 152, 184) and service guest clusters (e.g., service containers 150A-B), as well as their associated persistent volume claims for persistent storage volumes on storage nodes 170A-C, 172A-B, 186A-B. In an example, such records may be retrieved on all of system 100 or for a designated namespace (e.g., a namespace of the video game tenant executing service containers 150A-B and 152). In an example, storage controller 142 may inspect compute guests (e.g., service containers 150A-B, 152, 184) for performance metrics (e.g., storage throughput, storage capacity usage, storage latency, storage queues, etc.). For example, a storage driver associated with physical host 110A, hypervisor 120, VM 122, or storage container 160 may measure and/or track input output operations per second ("IOPS") of storage node 170A. In an example, a hardware sensor in memory device 114A may measure the IOPS of memory device 114A and hypervisor 120 may take these sensor measurements and attribute the storage usage to different components managed by hypervisor 120 (e.g., VM 122, storage container 160, etc.). In an example, timers may be implemented to measure response times to storage requests, and response times may be aggregated into, for example, rolling averages for reporting storage latency. In an example, rolling averages for queue depths for queued storage operations are tracked by a memory management unit (e.g., in hypervisor 120). In an example, used capacity of both logical volumes (e.g., storage node 170A and persistent storage volumes hosted in storage node 170A) as well as physical volumes (e.g., memory device 114A). In an example, performance metrics may be tracked historically and may also trigger notifications, for example, indicating that storage capacity requires scaling up. In an example, storage controller 142 may inspect storage nodes 170A-C, 172A-B, and 186A-B and/or individual persistent storage volumes in storage nodes 170A-C, 172A-B, and 186A-B for utilization metrics. These utilization metrics may additionally be analyzed against configured storage classes of the storage volumes (e.g., persistent storage volumes, storage nodes 170A-C, 172A-B, 186A-B). In an example, a given storage class may be configured with minimum and/or maximum values of various storage performance parameters (e.g., capacity, throughput, latency). In an example, storage class definitions may be fine tuned based on measured usage metrics for the storage class. In an example, a given storage volume may have its storage class changed by storage controller 142 based on measured utilization.

A projected storage demand factor is calculated by adjusting the current count of the first plurality of service guests with at least a first timing factor resulting in a projected count, and combining the projected count with at least a first storage class associated with the first plurality of service guests (block 210). In an example, orchestrator 140 and/or storage controller 142 calculates a projected storage demand factor based on known (e.g., historical compute usage patterns, cyclical compute usage patterns, preconfigured future demand, queued demand adjustments, etc.) and/or measurable (e.g., current compute usage, current storage usage, queued compute requests, compute request volume, etc.) factors. In an example, a count of service guests sharing a common categorization attribute (e.g., tenant, datacenter, geographical region, guest type, etc.) may be adjusted to project a future value of the current count based on timing factors. For example, the video game tenant's compute usage may peak daily at 8 PM with a daily low usage at 10 AM. The video game tenant's usage may also peak weekly between Friday night and Sunday night, and usage may spike on public holidays. In an example, the video game tenant may regularly release new content updates causing spikes in compute usage as well. These cyclical timing incidents and factors may be reliably used to project short and medium term changes in compute demand, which may be inferred to result in corresponding changes in storage demand. In an example, service containers 150A-B, and 152 are associated with a video game tenant, while service container 184 is associated with a financial news site. In the example, the financial news site typically peaks in usage during the morning commute when new articles are published, while access is reduced at night after work hours. Access is also typically higher during periods with many corporate announcements such as quarterly earnings. In the example, cyclical timing factors may differ significantly between the video game tenant and the financial news tenant resulting in different storage demand patterns. In some examples, the financial news site may require significantly less storage overall since little user data is being stored. In other examples, the financial news site may host large content files (e.g., videos) in container native storage or other highly converged storage to deliver higher performance content delivery. In an example, timing factors may include more immediately measurable computing demand, for example, a request to instantiate 30 service containers (either based on automated detection of demand or based on user configured request) may be correlated with a likely corresponding increase in storage demand. Similarly, a standing request to shut down a given hosted application at 2 AM on Saturday morning for scheduled maintenance may take precedence over other measureable factors for deprovisioning compute and storage for the application.

In an example, tenants, storage containers (e.g., storage containers 160, 162, 164, and 166), and/or storage nodes (e.g., storage nodes 170A-C, 172A-B, 186A-B) may be configured with one or more storage classes defining performance factors associated with the storage allocated for the respective tenants, storage containers (e.g., storage containers 160, 162, 164, and 166), and/or storage nodes (e.g., storage nodes 170A-C, 172A-B, 186A-B). These storage classes may be combined with projected compute usage in the form of projected service guest counts to compute projected storage demand. Storage classes may be user configured and/or automatically assigned based on measured usage. In an example, a user configured storage class may later be modified based on measured usage by storage controller 142. For example, a storage class may include one or more performance related settings such as storage replication settings (e.g., on, off, number of replicated copies), storage throughput settings (e.g., physical device read or write rates), storage capacity settings (e.g., physical storage size, deduplication, compression, etc.), storage networking settings (e.g., latency, bandwidth, routing priority), and/or location or zone based settings (e.g., rack, datacenter, security level, network permissioning, firewalls, etc.). For example, the video game tenant may require high performance storage for storing player interactions with the online game in a dynamically changing gaming environment, so a high performance, highly converged storage class is requested. In the example, storage for a given service container (e.g., service container 150A) is requested to be on the same physical host as the service container 150A (e.g., storage node 170A physically collocated on physical host 110A). Meanwhile, the news site may require high read rates but, since users are only consuming content and not updating the content, very low write rates are necessary. Therefore service container 184 need not be as closely collocated to storage node 186A, and storage node 186A similarly does not require the same level of I/O performance as storage node 170A. In the example, storage node 186A may be configured as a medium performance storage class with high read rates but may either leave other settings unspecified, or specify low minimum requirements for other storage settings. In an example, a storage node's storage class may dictate where the given storage node may be migrated (e.g., based on a destination storage container's available performance and capacity). In an example, a lower performance storage node (e.g., storage node 186A) may be migrated to share a storage container 160 with a higher performance storage node 170A, for example, due to a lower collocation requirement, but a new storage container may be required to be instantiated on the same host as a new service container where high performance is required. In such systems, an underutilized service container may be restricted from being terminated or migrated due to service container requirements on the same host, and the corresponding service containers may require migration to deprovision such storage containers and their respective storage nodes.

The orchestrator determines that the projected storage demand factor is lower than the current storage demand factor (block 215). In an example, orchestrator 140 and/or storage controller 142 determines, based on the computed projected storage demand factor, that storage demand in system 100 is decreasing, and therefore determines that one or more storage nodes will be deprovisioned. In various examples, storage controller 142 may factor in numerous measurable factors in determining to deprovision storage. For example, currently configured compute scaling (e.g., end of the work day for the news site), proportion of currently deployed service guests that use persistent storage and persistent volume claims (e.g., the news site may be deployed without persistent storage and its service containers may serve content directly from central storage units), overall counts of persistent storage volumes or persistent volume claims (e.g., consolidation is possible to reduce the number of storage containers), and/or storage class based counts of storage requests (e.g., low performance requests reduced in number such that dedicated storage containers for low performance storage nodes are no longer necessary, migrate to share other storage containers). In an example, the video game tenant may require high performance storage (e.g., for service container 152). In the example, rather than dedicating a high performance storage container to service container 152, due to lower storage performance requirements for the news site, storage node 186B in storage container 166 leaves sufficient throughput capacity for a high performance storage node 172A to be instantiated alongside lower performance storage node 186B. For example, storage container 166 may be configured to host medium performance storage class storage nodes, and the average storage performance requirements of storage nodes 172A and 186B may match the allocated resources for storage container 166. To illustrate, a high performance storage container may be configured with a dedicated 10,000 IOPS while a medium performance storage container may be configured with 5,000 IOPS. In the example, the high performance storage container may be able to host five storage nodes each requiring 2,000 TOPS, while the medium performance container may only host two. However, if the medium performance container is only hosting storage nodes that require 100 IOPs, then two of the storage nodes from a high performance storage container on the same host may be repointed to the medium performance container by, for example, remapping the physical storage to be managed by the medium performance container. In such an example, an underutilized high performance container may be shut down after the migration. In an example, writes to a storage node may be paused and buffered during a migration. In other examples, a copy-on write migration may be used. In an example, data migration to another local storage guest may be achieved by having both guests simultaneously map the physical memory of a storage node, with a short transient pause in insertions as control over the storage node is passed between storage guests.

In response to determining that the projected storage demand factor is lower than the current storage demand factor, termination of a first storage node of the first plurality of storage nodes is requested (block 220). In an example, the first storage node is selected for termination based on the first storage node lacking an active communication session with any service guest of the first plurality of service guests. In an example, storage node 170C is not currently connected directly with any service container. For example, one or more service containers previously connected to storage node 170C was previously terminated, and therefore storage node 170C is selected for termination based on lower projected storage demand due to the terminated service containers and a lack of queued service containers awaiting deployment.

Termination of the first storage node is canceled based on an association between the first storage node and a second storage node (block 225). In an example, storage node 170C responds to a termination request from storage controller 142 with a rejection or cancellation due to its association with storage nodes 170A and 170B. For example, storage nodes 170B and 170C may combine to provide replication for storage node 170A. In an example, storage containers 162 and 164 are both hosted on VM 124. At an earlier time, storage node 170A is launched and storage node 170B is created as a replication node to storage node 170A. However, storage node 170B may be created on storage container 162 which lacked capacity to scale up the size of storage node 170B when storage node 170A was scaled up (e.g., based on service container 150B being launched in addition to service container 150A). Storage node 170C may have been linked to storage node 170B based on storage container 162 being collocated with storage container 164 to address the lack of capacity. In the example, storage node 170C may therefore be restricted from shutting down due to replication requirements of a storage class of storage node 170A. In an example, due to overall reduced utilization, storage node 170B may now have sufficient capacity to fully provide replication for storage node 170A, and therefore storage node 170C may be shut down after consolidation with storage node 170B. For example, storage container 162 may have had other storage nodes shut down resulting in more capacity to grow storage node 170B. In an example, rather than terminating storage node 170C storage node 170B is terminated based on, for example, storage container 164 having sufficient capacity to consolidate storage nodes 170B and 170C, as well as sufficient capacity to have storage node 172B migrated over from storage node 162. In an example, storage node 172B is migrated to storage container 164 by modifying memory paging and/or virtual linking without any physical data being transferred due to storage containers 162 and 164 being collocated on the same physical host 110B or VM 124.

In another example, storage controller 142 requests termination of storage container 164 instead of storage node 170C. For example, storage controller 142 may be associated with the video game tenant and may lack access to see that storage node 186A is also on storage container 164. In the example, the termination request is rejected based on service container 184 actively utilizing storage node 186A. In an example, storage controller 142 may request another storage controller of the news site to migrate storage node 186A to continue terminating storage container 164. In an example, any association between a storage node requested for termination and another active storage node may result in a cancelled termination, for example, the storage node acting as a replication node, or facilitating throughput for another node, for example, as a local buffer for writes to a remote storage device. In some distributed storage systems, replication nodes may be distributed to other storage guests in a system storing unrelated data from unrelated tenants based on availability of storage capacity. Therefore, in such systems, termination without preparation may result in loss of data and/or failure to deliver requested performance.

In another example, storage node 170B is a replication node of storage node 170A without any current active communication sessions between service guests and storage node 170B. In the example, a termination request is sent to storage node 170B based on this lack of active communications but is rejected due to storage node 170B's replication duties. In the example, storage controller 142 discovers that storage container 164 associated with the news site of service container 184 has capacity available, and assigns storage node 170B to be migrated into storage container 164 as storage node 170C even though storage node 170B is associated with the video game tenant and not the news site tenant. In an example, post migration, storage node 170B is terminated. In an example, even though service containers 150A-B are configured to use storage nodes (e.g., storage nodes 170A-B) with a high performance storage class, storage controller 142 determines based on past usage that the video game application only actually requires high performance for a primary storage node and not for replication. Therefore, since storage node 170B lacks active service guest connections, it may be migrated to storage container 164 and reconfigured as a lower performance storage class without performance degradation for the video game application. In an example, storage controller 142 may reserve capacity to launch a new high performance storage node in storage container 166, in case another instance of service containers 150A-B is required, thereby ensuring that the video game application may be scaled up again if required.

In an example, deprovisioning storage may include geographical factors as well. For example, service guest usage may be tied to local time and therefore usage may shift across time zones. In an example, the video game tenant may require game data to be archived while not in use in preparation for scaling back up during the next peak gaming session. In an example, this data may be transitioned to another geographical region for archiving where current usage is low. In an example, performance of the video game application degrades unacceptably if a user is connected to a server more than five hundred miles away. In the example, guest clusters with service and storage containers may be brought on or offline in various global data centers based on usage timing in the local timezone, with game data archived to regional hubs instead of remaining in local data centers when not in use.

In an example, certain storage containers and/or storage nodes may have certain performance settings adjusted dynamically without termination. In an example, a new tenant's service guest requires instantiation and requires local storage. In the example, storage container 160 is detected to be underutilized, and its maximum capacity and/or throughput is reduced by storage controller 142 so that the new tenant's service and storage guest may be instantiated on VM 122. In an example, the number of CPU threads and cores, memory capacity and throughput, and network capacity and throughput of a given storage container or storage node may be modified by storage controller 142 after the respective storage container or storage node is already executing.

Figure 3:
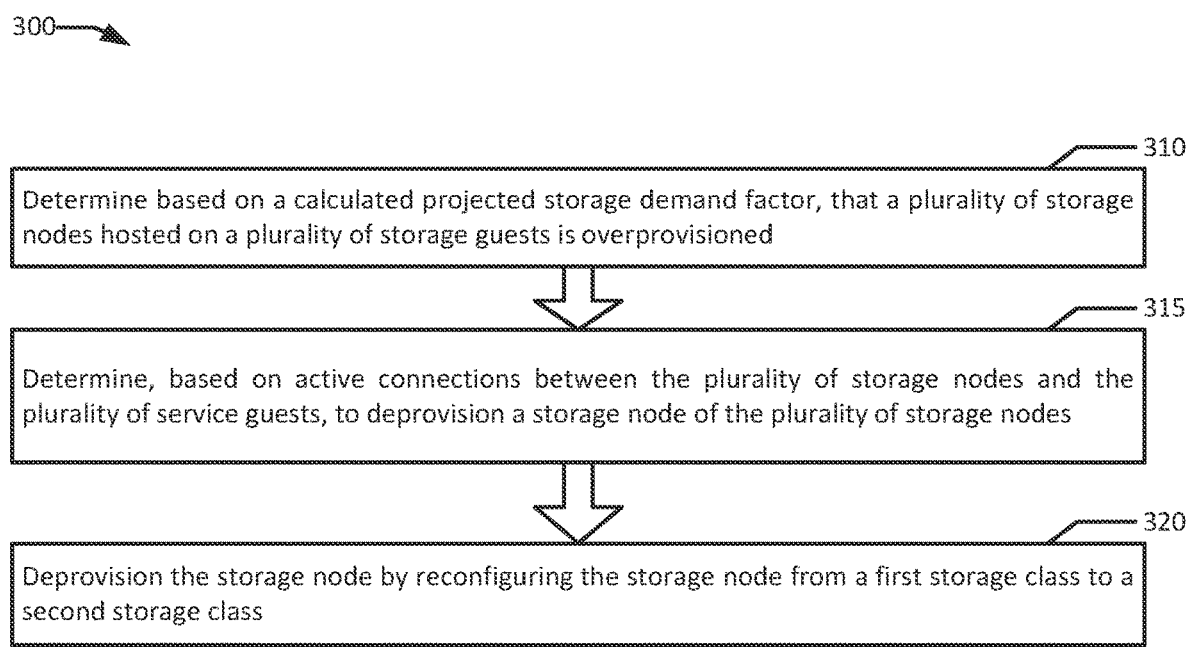
FIG. 3 is flowchart illustrating an example of stratified storage deprovisioning in a flexible deprovisioning of distributed storage system according to an example of the present disclosure.

FIG. 3 is flowchart illustrating an example of stratified storage deprovisioning in a flexible deprovisioning of distributed storage system according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by an orchestrator 140.

Example method 300 may begin determining, based on a calculated projected storage demand factor, that a first plurality of storage nodes hosted on a first plurality of storage guests is overprovisioned (block 305). In an example, the first plurality of storage nodes is associated with a first plurality of service guests. For example, the methods discussed above in relation to FIG. 2 may be employed to calculate a calculated projected storage demand factor for the near future in system 100, including various timing factors associated with storage usage. In some systems, especially ones where storage demand is steady, storage capacity deprovisioning may be recalibrated as a periodic job, for example, executed hourly or daily. In highly dynamic systems, storage deprovisioning may be executed on an ongoing basis, for example, triggered by dynamically scaling compute requirements (e.g., deploying or terminating service containers). In an example, since storage provisioning may typically require a time delay, it may be advantageous to delay storage deprovisioning, especially with storage associated with short-lived, transient services and applications that launch and terminate regularly (e.g., only trigger deprovisioning after five or fifteen minutes of disuse). In an example, an immediate demand for storage scaling may be recognized by orchestrator 140 based on capacity scaling performed by orchestrator 140 and/or system notifications subscribed to by orchestrator 140. For example, a termination request for service container 152 may trigger an audit of deprovisionable and/or terminable dependencies of service container 152. Similarly, one or more guests crashing or otherwise unexpectedly terminating may be a trigger to rebalance service and/or storage deployment as the crashed guests are re-initialized. For example, upon recovery, deployment of service and/or storage guests may be consolidated to use hardware resources more efficiently.

The orchestrator 140 determines, based on active communication sessions between the first plurality of storage nodes and the first plurality of service guests, to deprovision a first storage node of the first plurality of storage nodes (block 310). In an example, storage node 170B is selected for deprovisioning based on lacking any active communication sessions to any service guests. In another example, storage node 170A is selected for deprovisioning based on service container 150A being terminated. In the examples, service containers 150A-B may be configured with persistent volume claims for a first tier high performance storage class (e.g., highly converged, high throughput, high bandwidth storage with replication in triplicate). In various examples, storage classes may be predefined and/or dynamically defined by storage controller 142. For example, a storage class may include a plurality of storage related settings including replication, throughput, IO, capacity, networking, and location settings. In an example, certain settings may be predefined by an administrator at certain granularities for convenience and/or based on physical hardware constraints. For example, capacity for a given storage request (e.g., to instantiate a new storage container and/or storage node) may be defined in predetermined increments (e.g., 100 gb, 500 gb, and 1 TB). Similarly, a given storage container may be granted access to 1, 2, or 8 CPU threads or cores based on storage class performance configurations. Settings may additionally be guaranteed reservations or limits on reservation size. For example, a guaranteed reservation may limit the degree to which hardware resources may be overprovisioned on a given system more so than a reservation that only specifies an upper usage limit. For example, on a system with 1 TB of physical storage, a guaranteed reservation for a 500 GB logical storage node may leave only 500 GB for other uses, while a reservation for a logical storage node capped at 500 GB may initially only reserve 100 GB of physical storage for the logical storage node and allow the storage node to grow as storage space is used. In an example, three 500 GB logical storage nodes are hosted on 1 TB of physical storage, each initially sized at 100 GB and allowed to grow. In the example, an additional buffer reservation may be made, for example, 200

GB may be set aside in the system to cover sudden storage growth by any one of the three logical storage nodes. In an example, storage controller 142 may be configured to redefine storage class settings based on historical usage. For example, if median usage for the 500 GB capacity storage class is only 220 GB, the 500 GB storage class may be replaced with a 300 GB capacity storage class to increase node density on the hardware. Similarly, storage controller 142 may determine that a given storage class requires high throughput IO for a primary storage node (e.g., storage node 170A) connected to service guests (e.g., service containers 150A-B), but that replicated data for data security purposes on storage nodes 170B-C may require significantly less storage throughput and have significantly more tolerant of higher network latency, and therefore storage nodes 170B-C may be converted to lower performance storage classes.

The first storage node is deprovisioned by reconfiguring the first storage node from a first storage class to a second storage class (block 315). In an example storage node 170B is identified for deprovisioning based on lacking active service guest connections, for example, based on a service guest connected to storage node 170B being terminated. In the example, without active data IO from a connected application, storage node 170B is now only a replication node and requires less performance, and may therefore be reconfigured from a high performance storage class (e.g., highly converged, high throughput, high bandwidth storage with replication in triplicate) to a lower performance, backup node storage class (e.g., remotely located, medium write speed, low read speed, medium download bandwidth, low upload bandwidth). In an example, storage node 170B was originally deployed with the high performance storage class based on an additional copy of service containers 150A-B executing on VM 124 connecting directly to storage node 170B. In an example, the reclaimed storage and computing resources from deprovisioning storage node 170B may enable a new storage node to be deployed on storage container 162 that would not have been deployable without the reclaimed resources. In an example, storage nodes 170A-C may be associated in other ways beyond straight forward replication. For example, storage nodes 170A-C may be set up in a RAID 5 type of arrangement and exposed as a single logical volume. In the example, writes may originate on any one of storage nodes 170A-C and with data being replicated to the other nodes in an exclusive or operation. In another example, a storage node may provide a temporary buffer for data destined for a remote system, for example, for the duration of confirming network transmission. For example, service container 152 may store data primarily on storage node 172B, and storage node 172A may be a low capacity, high throughput buffer to hold data generated by service container 152 until it can be transmitted over the network to storage node 172B.

In an example, a given service guest (e.g., storage container 162) may be terminated along with deprovisioning one or more storage nodes on the storage guest. For example, storage node 170B may be merged into storage node 170C, and storage controller 142 may determine that storage container 162 should be reclaimed due to only having one storage node 172B executing in storage container 162. In the example, another host, for example, storage container 164 collocated with storage container 162 may be identified as having sufficient capacity to host storage node 172B. In the example, storage node 172B is also transitioned to storage container 164 allowing storage container 162 to be terminated.

In an example, storage node 170C is identified for deprovisioning. In the example, deprovisioning of storage node 170C is cancelled because it is identified that storage node 170C is actually also associated with storage node 186A-B. For example, storage node 170C has excess capacity currently being used to temporarily house data for the news site tenant and is therefore not solely associated with the video game tenant. In an example, this data may be transitioned off to deprovision storage node 170C. In an example, storage controller 142 may create composite storage nodes for replicating data from multiple tenants based on, for example, shared storage classes. These composite storage nodes may be used, for example, as temporary holding nodes to facilitate deprovisioning of other storage nodes. In an example, storage controller 142 downgrades the storage performance (e.g., storage class) of one or more storage nodes for a given tenant to be below the storage performance configured for those storage nodes by the tenant. For example, based on historical usage, storage nodes 170A-C are configured with 2 CPU threads and 250 gb of storage rather than the requested 4 CPU threads and 500 gb of storage. In an example, orchestrator 140 may reserve capacity on physical hosts 110A-B to instantiate at least one storage container and/or storage node with the full requested 4 CPU threads and 500 gb of storage in case the requested capacity is actually utilized. For example, storage container 162 may be configured to hold 20% of its capacity in reserve to upgrade the storage performance of storage node 170B if necessary. In an example, this reserved capacity is significantly less than the capacity that may be wasted as overhead if the storage nodes on storage container 162 are not deprovisioned by storage controller 142 based on usage factors.

Figure 4:
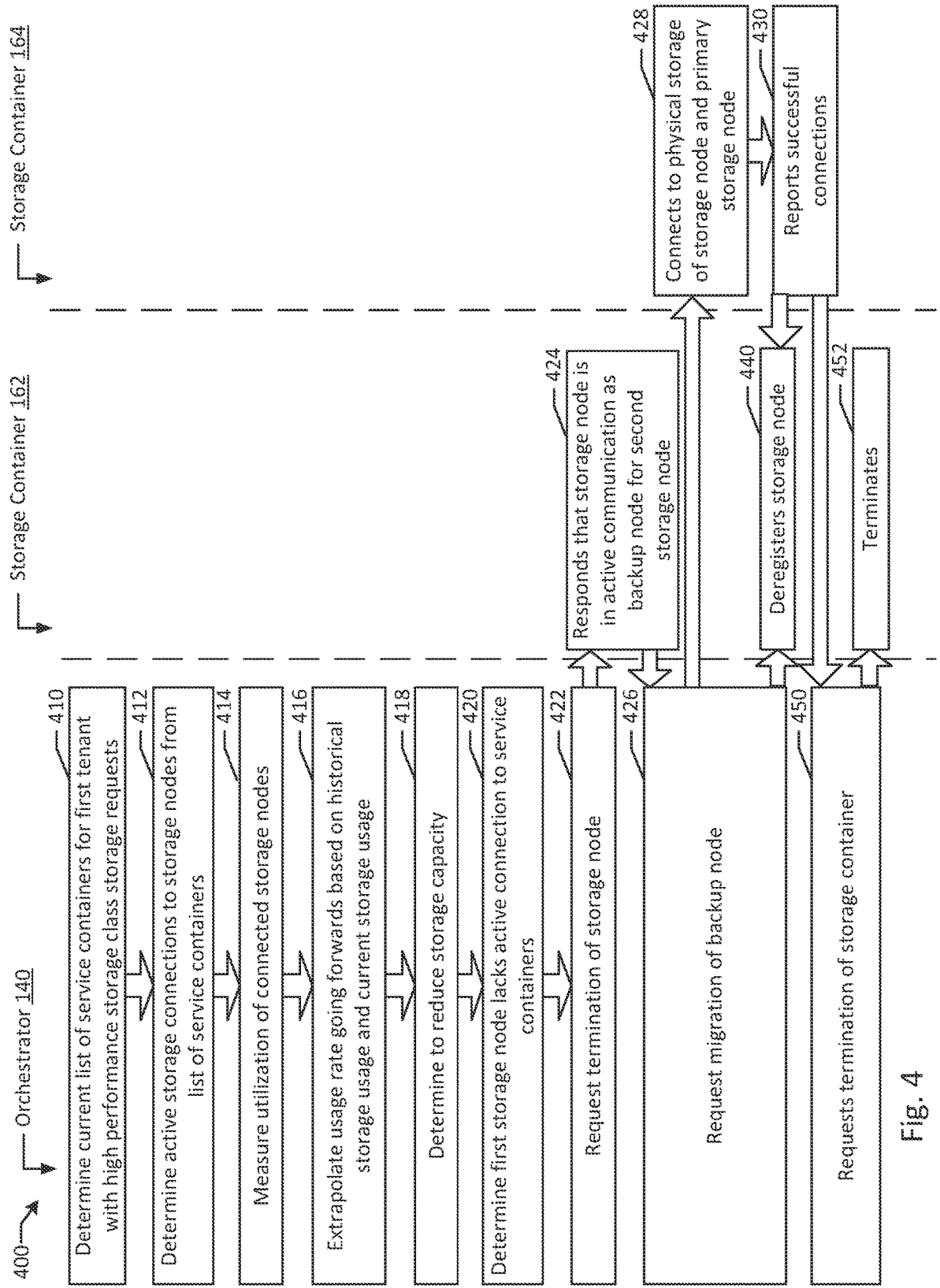
FIG. 4 is flow diagram of an example of alternative storage deprovisioning in a flexible deprovisioning of distributed storage system according to an example of the present disclosure.

FIG. 4 is flow diagram of an example of alternative storage deprovisioning in a flexible deprovisioning of distributed storage system according to an example of the present disclosure. Although the examples below are described with reference to the flow diagram illustrated in FIG. 4, it will be appreciated that many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 400, orchestrator 140 coordinates the deprovisioning of storage nodes hosted on storage containers 162 and 164.

In example system 400, orchestrator 140 and/or storage controller 142 determines that a current list of service containers (e.g., service containers 150A-B, 152) for the video game tenant with a high performance storage class persistent volume claims (e.g., for storage nodes 170A-B, 172A-B) (block 410). In an example, orchestrator 140 determines that storage nodes 170A and 172A have active communication sessions from service containers 150A-B, and 152 (block 412). In an example, storage controller 142 measures the storage utilization (e.g., capacity, throughput, etc.) of storage nodes 170A and 172A, and also their associated storage nodes 170B and 172B (block 414). In the example, a short term future usage rate of storage nodes 170A and 172A is extrapolated by storage controller 142 based on the current measured usage and historical usage data from previous iterations of storage for previous iterations of service containers 150A-B and 152 (block 416). In an example, orchestrator 140 determines to reduce storage capacity for service containers 150A-B and 152 (block 418). In the example, orchestrator 140 determines that storage node 170B lacks any active communication session to any service container (block 420). In the example, orchestrator 140 requests termination of storage node 170B (block 422).

Upon receiving the request to terminate storage node 170B, storage container 162 responds that storage node 170B is in active communication with storage nodes 170A as a backup replication node for storage node 170A (block 424). In an example, orchestrator 140 requests migration of storage node 170B in order for storage node 170B to be deprovisioned (block 426). In the example, storage container 164 is identified as a destination to migrate storage node 170B, for example, based on storage node 170C executing on storage container 164. In the example, upon notification, storage container 164 maps the physical storage of storage node 170B as a storage node 170C, and connects to storage node 170A to resume replication of storage node 170A into storage node 170C (block 428). In the example, storage container 164 reports its successful instantiation of storage node 170C to orchestrator 140 and storage container 162 (block 430). In response to receiving the migration request from orchestrator 140, and the acknowledgement of success from storage container 164, storage container 162 deregisters (e.g., unmaps, disconnects, etc.) storage node 170B (block 440). In an example, storage container 162 is only hosting one storage node 170B. In another example, other storage nodes (e.g., storage node 172B) on storage container 162 are also migrated. In the examples, with no active storage nodes hosted, orchestrator 140 and/or storage controller 142 requests termination of storage container 162 (block 450). In the example, storage container 162 then terminates (block 452).

Figure 5:
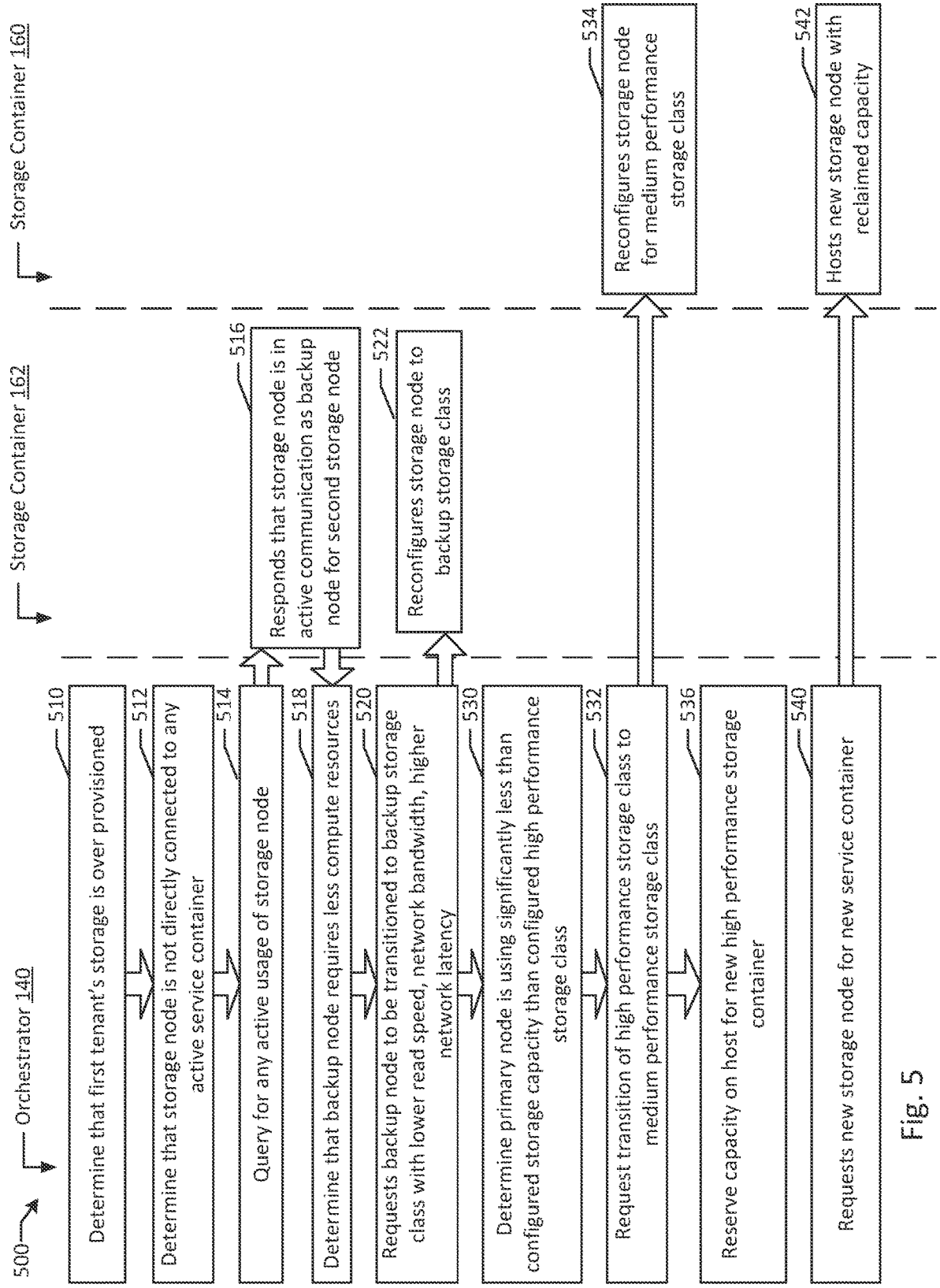
FIG. 5 is flow diagram of an example of storage class based storage deprovisioning in a flexible deprovisioning of distributed storage system according to an example of the present disclosure.

FIG. 5 is flow diagram of an example of storage class based storage deprovisioning in a flexible deprovisioning of distributed storage system according to an example of the present disclosure. Although the examples below are described with reference to the flow diagram illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 500, orchestrator 140 coordinates the deprovisioning of storage nodes hosted on storage containers 160 and 162.

In example system 500, orchestrator 140, including storage controller 142, determines that a first tenant (e.g., the video game tenant of service containers 150A-B, 152) is over provisioned for storage (e.g., storage nodes 170A-C, 172A-B) (block 510). For example, where the five storage nodes 170A-C and 172A-B previously served ten service containers, only three service containers are currently executing so there is significant over capacity. However, in the example, a proportionate shutdown of storage containers (e.g., storage containers 162, 164, 166, 168) and/or storage nodes (e.g., storage nodes 170A-C, 172A-B) may impact the services of the service containers 150A-B, 152 still executing. In an example, if service containers 150A-B require a high performance storage class with local storage and high throughput, storage container 162 needs to continue executing to provide storage node 170A, even if the actual capacity used on storage node 170A is reduced significantly from, for example, when five service containers are connected to storage node 170A. Therefore, the overhead represented by running storage container 162 cannot be reclaimed unless service containers 150A-B are also migrated, which may not be possible if, for example, service containers 150A-B are the only copies of the video game application executing to serve a given geographical region (e.g., Hawaii).

In an example, orchestrator 140 determines that storage node 170B is not directly connected to any active service container (block 512). In the example, storage container 162 is queried to discover any active usage of storage node 170B (block 514). In alternative examples, storage controller 142 may maintain records of storage node usage registrations, for example, in the form of persistent volume claims served by storage node 170B. In an example, storage controller 142 may query a storage registration database for usage information prior to verifying the usage information from the storage node 170B and/or its host storage container 162 directly. In an example, storage container 162 responds that the storage node 170B is in active communication with storage node 170A as a backup node for storage node 170A (block 516). In the Hawaiian islands example, storage node 170A and physical host 110A may be on the Hawaiian islands while storage node 170B and its host physical host 110B may be in California, for example, if backups can be delayed by the network transfer time between Hawaii and California. In an example, storage node 170B may previously have served service containers in California, but those service containers may have shut down as users logged off at 2 AM, therefore leaving only service container 152 executing in California. In an example, orchestrator 140 determines that, as purely a backup node, may require less CPU cycles, network upload bandwidth, and/or other storage resources than it was originally configured with (block 518). In the example, orchestrator 140 requests storage node 170B to be transitioned to a lower performance backup node storage class with lower read speed, less network bandwidth, and higher network latency (block 520). In the example, storage container 162 reconfigures storage node 170B from a high performance storage class to the backup storage class (block 522).

In an example, orchestrator 140 determines that as Hawaiian time is turning to 12 AM, fewer users are actively using the Hawaiian infrastructure for the game, and that primary storage node 170A is using significantly less storage capacity and throughput than its configured high performance storage class (block 530). In the example, orchestrator 140 requests that storage node 170A be transitioned from the high performance storage class to a medium performance storage class (block 532). In the example, storage container 160 reconfigures storage node 170A to the medium performance storage class (block 534). For example, instead of dedicating four CPU threads to storage node 170A, as a medium performance storage node, the updated storage node 170A has access to only two CPU threads and is only guaranteed access to one thread. In an example, multiple storage nodes and/or storage containers on physical host 110A are deprovisioned by orchestrator 140 and/or storage controller 142. In the example, orchestrator 140 reserves capacity on physical host 110A and/or VM 122 to host a new high performance storage container and/or high performance storage node in case that after deprovisioning, a spike in demand cannot be handled by the remaining storage capacity on the deprovisioned host (block 536). In an example, orchestrator 140 requests a new storage node for a new service container instantiated on VM 122, for example, for a volcano sunrise tour website that receives extra traffic in the middle of the night (block 540). In the example, a new storage node is hosted with the reclaimed capacity, including the reclaimed CPU threads from the deprovisioning of storage node 170A (block 542).

Figure 6:
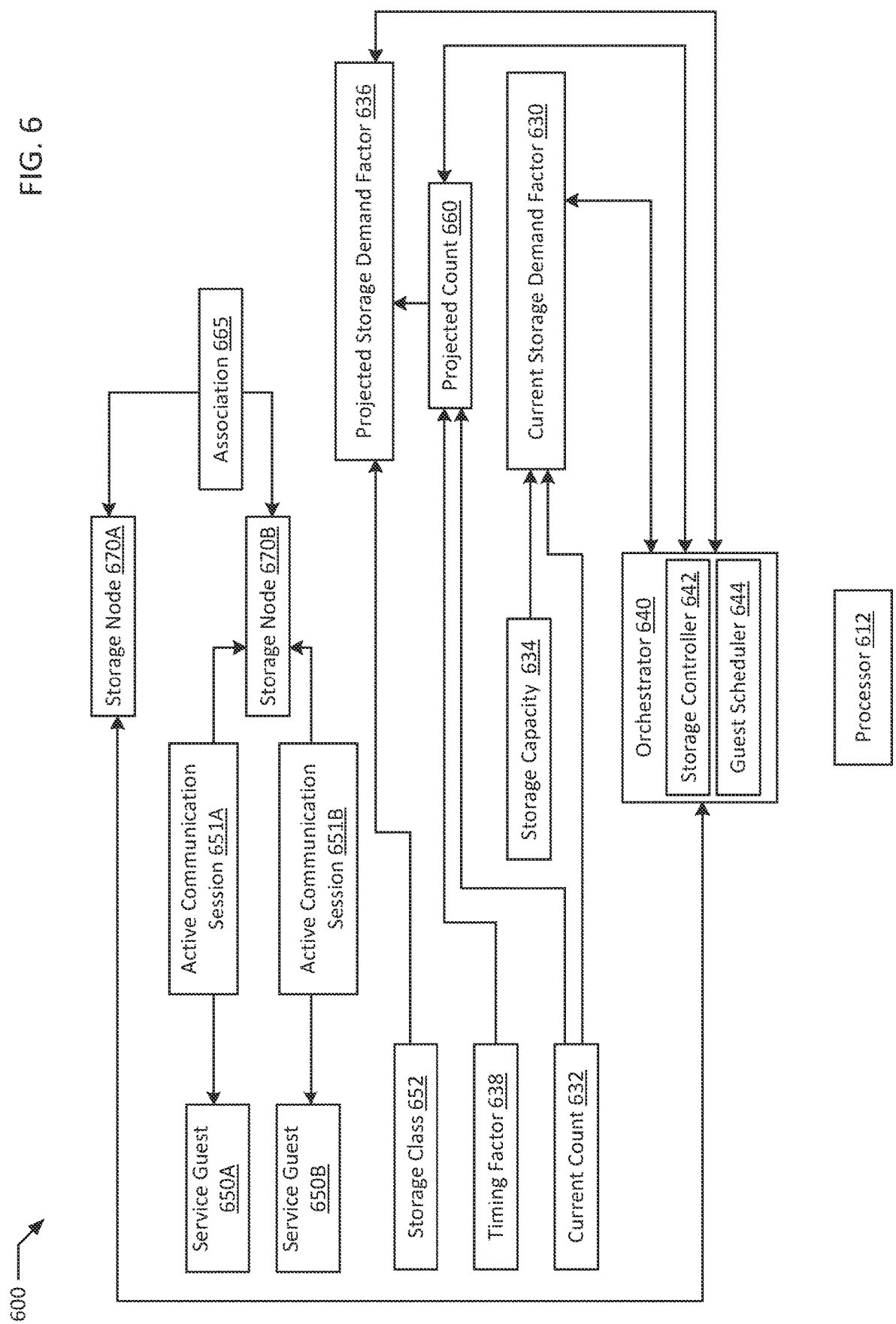
FIG. 6 is block diagram of a distributed storage deprovisioning cancellation system according to an example of the present disclosure.

FIG. 6 is block diagram of a distributed storage deprovisioning cancellation system according to an example of the present disclosure. Example system 600 includes orchestrator 640 including storage controller 642 managing storage nodes 670A-B and a guest scheduler 644. Orchestrator 640 executes on processor 612 to measure current storage demand factor 630 based on current count 632 of service guests 650A-B and a storage capacity 634 of storage nodes 670A-B. Projected storage demand factor 636 is calculated by first adjusting current count 632 with a timing factor 638 resulting in a projected count 660, and then the projected count 660 is combined with storage class 652 associated with service guests 650A-B. Projected storage demand factor 636 is determined to be lower than current storage demand factor 630, and in response, termination of storage node 670A is requested based on a lack of an active communication session (e.g., lack of active communication sessions 651A-B) with service guests 650A-B. Termination of storage node 670A is canceled based on an association 665 between storage node 670A and storage node 670B.

Figure 7:
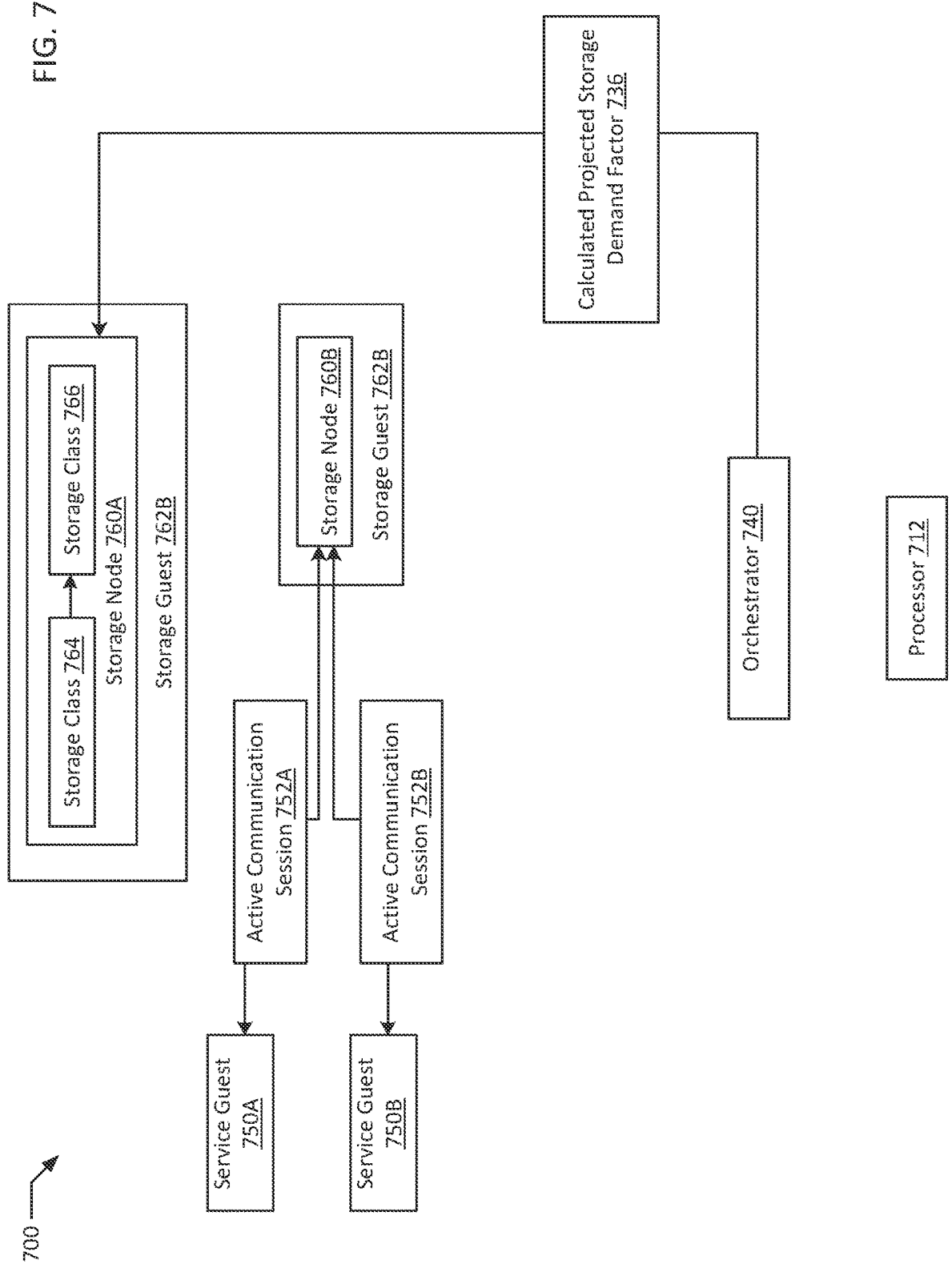
FIG. 7 is block diagram of a flexible deprovisioning of distributed storage system according to an example of the present disclosure.

FIG. 7 is block diagram of a flexible deprovisioning of distributed storage system according to an example of the present disclosure. Example system 700 includes storage nodes 760A-B hosted on storage guests 762A-B, with storage nodes 760A-B being associated with service guests 750A-B. Orchestrator 740 executes on processor 712 to determine, based on calculated projected storage demand factor 736, that storage nodes 760A-B are overprovisioned. Orchestrator 740 determines, based on active communication sessions 752A-B between storage nodes 760A-B and service guests 750A-B, to deprovision storage node 760A. Storage node 760A is deprovisioned by reconfiguring storage node 760A from storage class 764 to storage class 766.

Flexible deprovisioning of distributed storage systems allows for increased efficiency in right-sizing storage allocation to match highly fluid computing resource demands in large scale dynamic compute hosting environments. Distributed storage systems allow for highly converged, highly performant persistent data storage, but often at the cost of downscaling flexibility due to inherent interlinking between different storage nodes in the distributed storage system. Therefore, while scaling up such systems may be proportional to scaling up computing resources based on compute demand, after such scaling up is achieved, various nodes of the distributed storage system may become interlinked with each other such that a given storage node may be a dependency of a service that was never directly connected to the storage node. By creating a ruleset by which storage nodes may be safely deprovisioned, and by triggering these deprovisioning rules based on measurable demand factors, storage allocation may much more closely track actual storage demand based on active computing sessions. In addition, flexible deprovisioning of distributed storage systems allows for storage controllers to increase deployed storage density by adjusting the storage resources of configured storage classes to track trends in actual storage usage rather than relying on an estimation of worst case scenarios for resource allocation. In addition, by validating before deprovisioning deployed storage nodes, and by actively modifying storage classes of deployed storage nodes, storage nodes are protected from overzealous decommissioning while deprovisioning of actively used storage nodes is enabled due to flexible migration of active storage nodes. Therefore storage utilization is increased while preserving desired storage performance for service guests, advantageously resulting in an overall improvement in hardware utilization.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system comprises: an orchestrator including a storage controller managing a first plurality of storage nodes and a guest scheduler; and the orchestrator executes on one or more processors to: measure a current storage demand factor based on a current count of a first plurality of service guests and a storage capacity of the first plurality of storage nodes; calculate a projected storage demand factor by (i) adjusting the current count of the first plurality of service guests with at least a first timing factor resulting in a projected count, and (ii) combining the projected count with at least a first storage class associated with the first plurality of service guests; determine that the projected storage demand factor is lower than the current storage demand factor; responsive to determining that the projected storage demand factor is lower than the current storage demand factor, request termination of a first storage node of the first plurality of storage nodes, wherein the first storage node is selected for termination based on the first storage node lacking an active communication session with any service guest of the first plurality of service guests; and cancel terminating the first storage node based on an association between the first storage node and a second storage node.

In accordance with a 2nd exemplary aspect of the present disclosure, which may be used in combination with any one or more of other aspects described herein (e.g., the 1st aspect), wherein the first plurality of storage nodes is hosted on a plurality of storage guests, including a first storage guest hosting the first storage node and a second storage guest hosting the second storage node. In accordance with a 3rd exemplary aspect of the present disclosure, which may be used in combination with any one or more of other aspects described herein (e.g., the 2nd aspect), wherein the first storage node becomes associated with a third storage guest, and the first storage guest is terminated after the first storage node becomes associated with the third storage guest. In accordance with a 4th exemplary aspect of the present disclosure, which may be used in combination with any one or more of other aspects described herein (e.g., the 3rd aspect), wherein a second plurality of storage nodes is associated with a second plurality of storage guests, and the third storage guest is a guest of the second plurality of storage guests. In accordance with a 5th exemplary aspect of the present disclosure, which may be used in combination with any one or more of other aspects described herein (e.g., the 2nd aspect), wherein a third storage node is hosted on both a third storage guest and a fourth storage guest.

In accordance with a 6th exemplary aspect of the present disclosure, which may be used in combination with any one or more of other aspects described herein (e.g., the 1st aspect), wherein the first plurality of service guests is associated with a first tenant and a second plurality of service guests is associated with a second tenant, and a different second timing factor applies to the second tenant. In accordance with a 7th exemplary aspect of the present disclosure, which may be used in combination with any one or more of other aspects described herein (e.g., the 1st aspect), wherein the first timing factor includes at least one of a cyclical demand and a currently unfulfilled demand. In accordance with an 8th exemplary aspect of the present disclosure, which may be used in combination with any one or more of other aspects described herein (e.g., the 1st aspect), wherein a third storage node is terminated in response to cancelling termination of the first storage node. In accordance with a 9th exemplary aspect of the present disclosure, which may be used in combination with any one or more of other aspects described herein (e.g., the 1st aspect), wherein a list of active communication sessions between the first plurality of service guests and the first plurality of storage nodes is generated. In accordance with a 10th exemplary aspect of the present disclosure, which may be used in combination with any one or more of other aspects described herein (e.g., the 1st aspect), wherein data in the second storage node is replicated to the first storage node.

In accordance with a 11th exemplary aspect of the present disclosure, which may be used in combination with any one or more of other aspects described herein (e.g., the 1st aspect), wherein the first storage class includes at least two settings of (i) a replication setting, (ii) an input/output setting, (iii) a capacity setting, (iv) a network setting, and (v) a zone setting. In accordance with a 12th exemplary aspect of the present disclosure, which may be used in combination with any one or more of other aspects described herein (e.g., the 11th aspect), wherein a second storage class replaces at least one setting of the first storage class with a lower performance setting, and a third storage node of the first plurality of storage nodes is reconfigured from the first storage class to the second storage class. In accordance with a 13th exemplary aspect of the present disclosure, which may be used in combination with any one or more of other aspects described herein (e.g., the 12th aspect), wherein the third storage node is reconfigured based on a measured usage criteria of the third storage node.

In accordance with a 14th exemplary aspect of the present disclosure, which may be used in combination with any one or more of other aspects described herein (e.g., the 1st aspect), wherein a third storage node of the first plurality of storage nodes is instantiated in a storage guest based on determining that the projected storage demand factor is higher than the current storage demand factor.

Aspects of the subject matter described herein may be useful alone or in combination with one or more other aspects described herein. In a 15th exemplary aspect of the present disclosure, a system comprises a means for measuring a current storage demand factor based on a current count of a first plurality of service guests and a storage capacity of a first plurality of storage nodes; a means for calculating a projected storage demand factor by (i) adjusting the current count of the first plurality of service guests with at least a first timing factor resulting in a projected count, and (ii) combining the projected count with at least a first storage class associated with the first plurality of service guests; a means for determining that the projected storage demand factor is lower than the current storage demand factor; responsive to determining that the projected storage demand factor is lower than the current storage demand factor, a means for requesting termination of a first storage node of the first plurality of storage nodes, wherein the first storage node is selected for termination based on the first storage node lacking an active communication session with any service guest of the first plurality of service guests; and a means for canceling terminating the first storage node based on an association between the first storage node and a second storage node.

Aspects of the subject matter described herein may be useful alone or in combination with one or more other aspects described herein. In a 16th exemplary aspect of the present disclosure, a computer-readable non-transitory storage medium storing executable instructions, which when executed by a computer system, cause the computer system to: measure a current storage demand factor based on a current count of a first plurality of service guests and a storage capacity of a first plurality of storage nodes; calculate a projected storage demand factor by (i) adjusting the current count of the first plurality of service guests with at least a first timing factor resulting in a projected count, and (ii) combining the projected count with at least a first storage class associated with the first plurality of service guests; determine that the projected storage demand factor is lower than the current storage demand factor; responsive to determining that the projected storage demand factor is lower than the current storage demand factor, request termination of a first storage node of the first plurality of storage nodes, wherein the first storage node is selected for termination based on the first storage node lacking an active communication session with any service guest of the first plurality of service guests; and cancel terminating the first storage node based on an association between the first storage node and a second storage node.

Aspects of the subject matter described herein may be useful alone or in combination with one or more other aspects described herein. In a 17th exemplary aspect of the present disclosure, a method comprises measuring a current storage demand factor based on a current count of a first plurality of service guests and a storage capacity of a first plurality of storage nodes; calculating a projected storage demand factor by (i) adjusting the current count of the first plurality of service guests with at least a first timing factor resulting in a projected count, and (ii) combining the projected count with at least a first storage class associated with the first plurality of service guests; determining that the projected storage demand factor is lower than the current storage demand factor; responsive to determining that the projected storage demand factor is lower than the current storage demand factor, requesting termination of a first storage node of the first plurality of storage nodes, wherein the first storage node is selected for termination based on the first storage node lacking an active communication session with any service guest of the first plurality of service guests; and canceling terminating the first storage node based on an association between the first storage node and a second storage node.

In accordance with an 18th exemplary aspect of the present disclosure, which may be used in combination with any one or more of other aspects described herein (e.g., the 15th, 16th, or 17th aspects), wherein the first plurality of storage nodes is hosted on a plurality of storage guests, including a first storage guest hosting the first storage node and a second storage guest hosting the second storage node. In accordance with a 19th exemplary aspect of the present disclosure, which may be used in combination with any one or more of other aspects described herein (e.g., the 18th aspect), further comprises: associating the first storage node with a third storage guest; and terminating the first storage guest after the first storage node becomes associated with the third storage guest. In accordance with a 20th exemplary aspect of the present disclosure, which may be used in combination with any one or more of other aspects described herein (e.g., the 19th aspect), wherein a second plurality of storage nodes is associated with a second plurality of storage guests, and the third storage guest is a guest of the second plurality of storage guests. In accordance with a 21st exemplary aspect of the present disclosure, which may be used in combination with any one or more of other aspects described herein (e.g., the 18th aspect), wherein a third storage node is hosted on both a third storage guest and a fourth storage guest.

In accordance with a 22nd exemplary aspect of the present disclosure, which may be used in combination with any one or more of other aspects described herein (e.g., the 15th, 16th, or 17th aspects), wherein the first plurality of service guests is associated with a first tenant and a second plurality of service guests is associated with a second tenant, and a different second timing factor applies to the second tenant. In accordance with a 23rd exemplary aspect of the present disclosure, which may be used in combination with any one or more of other aspects described herein (e.g., the 15th, 16th, or 17th aspects), wherein the first timing factor includes at least one of a cyclical demand and a currently unfulfilled demand. In accordance with a 24th exemplary aspect of the present disclosure, which may be used in combination with any one or more of other aspects described herein (e.g., the 15th, 16th, or 17th aspects), further comprises: terminating a third storage node in response to cancelling termination of the first storage node. In accordance with a 25th exemplary aspect of the present disclosure, which may be used in combination with any one or more of other aspects described herein (e.g., the 15th, 16th, or 17th aspects), further comprises: generating a list of active communication sessions between the first plurality of service guests and the first plurality of storage nodes. In accordance with a 26th exemplary aspect of the present disclosure, which may be used in combination with any one or more of other aspects described herein (e.g., the 15th, 16th, or 17th aspects), further comprises: replicating data in the second storage node to the first storage node.

In accordance with a 27th exemplary aspect of the present disclosure, which may be used in combination with any one or more of other aspects described herein (e.g., the 15th, 16th, or 17th aspects), wherein the first storage class includes at least two settings of (i) a replication setting, (ii) an input/output setting, (iii) a capacity setting, (iv) a network setting, and (v) a zone setting. In accordance with a 28th exemplary aspect of the present disclosure, which may be used in combination with any one or more of other aspects described herein (e.g., the 27th aspects), further comprises: wherein a second storage class replaces at least one setting of the first storage class with a lower performance setting, and a third storage node of the first plurality of storage nodes is reconfigured from the first storage class to the second storage class. In accordance with a 29th exemplary aspect of the present disclosure, which may be used in combination with any one or more of other aspects described herein (e.g., the 28th aspects), further comprises: reconfiguring the third storage node based on a measured usage criteria of the third storage node.

In accordance with a 30th exemplary aspect of the present disclosure, which may be used in combination with any one or more of other aspects described herein (e.g., the 15th, 16th, or 17th aspects), instantiating a third storage node of the first plurality of storage nodes in a storage guest based on determining that the projected storage demand factor is higher than the current storage demand factor.

Aspects of the subject matter described herein may be useful alone or in combination with one or more other aspects described herein. In a 31st exemplary aspect of the present disclosure, a system comprises a first plurality of storage nodes hosted on a first plurality of storage guests, wherein the first plurality of storage nodes is associated with a first plurality of service guests; an orchestrator executing on one or more processors to: determine based on a calculated projected storage demand factor, that the first plurality of storage nodes is overprovisioned; determine, based on active communication sessions between the first plurality of storage nodes and the first plurality of service guests, to deprovision a first storage node of the first plurality of storage nodes; and deprovision the first storage node by reconfiguring the first storage node from a first storage class to a second storage class.

In accordance with a 32nd exemplary aspect of the present disclosure, which may be used in combination with any one or more of other aspects described herein (e.g., the 31st aspect), wherein the first storage node lacks an active communication session to the first plurality of storage nodes. In accordance with a 33rd exemplary aspect of the present disclosure, which may be used in combination with any one or more of other aspects described herein (e.g., the 32nd aspect), wherein the orchestrator is notified of a termination of a first service guest of the first plurality of service guests associated with the first storage node.

In accordance with a 34th exemplary aspect of the present disclosure, which may be used in combination with any one or more of other aspects described herein (e.g., the 31st aspect), wherein the first storage node stores data replicated from a second storage node. In accordance with a 35th exemplary aspect of the present disclosure, which may be used in combination with any one or more of other aspects described herein (e.g., the 34th aspect), wherein the second storage node is configured with the first storage class.

In accordance with a 36th exemplary aspect of the present disclosure, which may be used in combination with any one or more of other aspects described herein (e.g., the 31st aspect), wherein a timing factor is included in calculating the calculated projected storage demand factor. In accordance with a 37th exemplary aspect of the present disclosure, which may be used in combination with any one or more of other aspects described herein (e.g., the 31st aspect), wherein the first storage class includes at least two settings of (i) a replication setting, (ii) an input/output setting, (iii) a capacity setting, (iv) a network setting, and (v) a zone setting. In accordance with a 38th exemplary aspect of the present disclosure, which may be used in combination with any one or more of other aspects described herein (e.g., the 31st aspect), wherein deprovisioning the first storage node includes terminating a first storage guest associated with the first storage node. In accordance with a 39th exemplary aspect of the present disclosure, which may be used in combination with any one or more of other aspects described herein (e.g., the 31st aspect), wherein deprovisioning the first storage node includes reassociating the first storage node from a first storage guest to a second storage guest. In accordance with a 40th exemplary aspect of the present disclosure, which may be used in combination with any one or more of other aspects described herein (e.g., the 31st aspect), wherein deprovisioning of a second storage node of the first plurality of storage nodes is cancelled based on an association between the second storage node and a third storage node. In accordance with a 41st exemplary aspect of the present disclosure, which may be used in combination with any one or more of other aspects described herein (e.g., the 40th aspect), wherein the third storage node is a storage node of a different second plurality of storage nodes and the third storage node is not a member of the first plurality of storage nodes. In accordance with a 42th exemplary aspect of the present disclosure, which may be used in combination with any one or more of other aspects described herein (e.g., the 41st aspect), wherein the third storage node is associated with a second plurality of service guests.

In accordance with a 43rd exemplary aspect of the present disclosure, which may be used in combination with any one or more of other aspects described herein (e.g., the 31st aspect), wherein a first service guest associated with the first storage node is configured to request storage of the first storage class. In accordance with a 44th exemplary aspect of the present disclosure, which may be used in combination with any one or more of other aspects described herein (e.g., the 31st aspect), wherein a second plurality of storage nodes within the first plurality of storage nodes is reconfigured from the first storage class to the second storage class, and the orchestrator reserves compute capacity to instantiate at least one storage node of the first storage class in response to reconfiguring the second plurality of storage nodes.

Aspects of the subject matter described herein may be useful alone or in combination with one or more other aspects described herein. In a 45th exemplary aspect of the present disclosure, a system comprises a means for determining based on a calculated projected storage demand factor, that a first plurality of storage nodes hosted on a first plurality of storage guests is overprovisioned, wherein the first plurality of storage nodes is associated with a first plurality of service guests; a means for determining, based on active communication sessions between the first plurality of storage nodes and the first plurality of service guests, to deprovision a first storage node of the first plurality of storage nodes; and a means for deprovisioning the first storage node by reconfiguring the first storage node from a first storage class to a second storage class.

Aspects of the subject matter described herein may be useful alone or in combination with one or more other aspects described herein. In a 46th exemplary aspect of the present disclosure, a computer-readable non-transitory storage medium storing executable instructions, which when executed by a computer system, cause the computer system to: determine based on a calculated projected storage demand factor, that a first plurality of storage nodes hosted on a first plurality of storage guests is overprovisioned, wherein the first plurality of storage nodes is associated with a first plurality of service guests; determine, based on active communication sessions between the first plurality of storage nodes and the first plurality of service guests, to deprovision a first storage node of the first plurality of storage nodes; and deprovision the first storage node by reconfiguring the first storage node from a first storage class to a second storage class.

Aspects of the subject matter described herein may be useful alone or in combination with one or more other aspects described herein. In a 47th exemplary aspect of the present disclosure, a method comprises determining based on a calculated projected storage demand factor, that a first plurality of storage nodes hosted on a first plurality of storage guests is overprovisioned, wherein the first plurality of storage nodes is associated with a first plurality of service guests; determining, based on active communication sessions between the first plurality of storage nodes and the first plurality of service guests, to deprovision a first storage node of the first plurality of storage nodes; and deprovisioning the first storage node by reconfiguring the first storage node from a first storage class to a second storage class.

In accordance with a 48th exemplary aspect of the present disclosure, which may be used in combination with any one or more of other aspects described herein (e.g., the 45th, 46th, or 47th aspects), wherein the first storage node lacks an active communication session to the first plurality of storage nodes. In accordance with a 49th exemplary aspect of the present disclosure, which may be used in combination with any one or more of other aspects described herein (e.g., the 48th aspect), notifying an orchestrator of a termination of a first service guest of the first plurality of service guests associated with the first storage node.

In accordance with a 50th exemplary aspect of the present disclosure, which may be used in combination with any one or more of other aspects described herein (e.g., the 45th, 46th, or 47th aspects), further comprising storing data replicated from a second storage node in the first storage node. In accordance with a 51st exemplary aspect of the present disclosure, which may be used in combination with any one or more of other aspects described herein (e.g., the 50th aspect), wherein the second storage node is configured with the first storage class.

In accordance with a 52th exemplary aspect of the present disclosure, which may be used in combination with any one or more of other aspects described herein (e.g., the 45th, 46th, or 47th aspects), wherein a timing factor is included in calculating the calculated projected storage demand factor. In accordance with a 53rd exemplary aspect of the present disclosure, which may be used in combination with any one or more of other aspects described herein (e.g., the 45th, 46th, or 47th aspects), wherein the first storage class includes at least two settings of (i) a replication setting, (ii) an input/output setting, (iii) a capacity setting, (iv) a network setting, and (v) a zone setting. In accordance with a 54th exemplary aspect of the present disclosure, which may be used in combination with any one or more of other aspects described herein (e.g., the 45th, 46th, or 47th aspects), further comprises: deprovisioning the first storage node by terminating a first storage guest associated with the first storage node. In accordance with a 55th exemplary aspect of the present disclosure, which may be used in combination with any one or more of other aspects described herein (e.g., the 45th, 46th, or 47th aspects), further comprises: deprovisioning the first storage node by reassociating the first storage node from a first storage guest to a second storage guest.

In accordance with a 56th exemplary aspect of the present disclosure, which may be used in combination with any one or more of other aspects described herein (e.g., the 45th, 46th, or 47th aspects), further comprises: cancelling deprovisioning of a second storage node of the first plurality of storage nodes based on an association between the second storage node and a third storage node. In accordance with a 57th exemplary aspect of the present disclosure, which may be used in combination with any one or more of other aspects described herein (e.g., the 56th aspect), wherein the third storage node is a storage node of a different second plurality of storage nodes and the third storage node is not a member of the first plurality of storage nodes. In accordance with a 58th exemplary aspect of the present disclosure, which may be used in combination with any one or more of other aspects described herein (e.g., the 56th aspect), wherein the third storage node is associated with a second plurality of service guests.

In accordance with a 59th exemplary aspect of the present disclosure, which may be used in combination with any one or more of other aspects described herein (e.g., the 45th, 46th, or 47th aspects), further comprises: configuring a first service guest associated with the first storage node to request storage of the first storage class. In accordance with a 59th exemplary aspect of the present disclosure, which may be used in combination with any one or more of other aspects described herein (e.g., the 45th, 46th, or 47th aspects), further comprises: reconfiguring a second plurality of storage nodes within the first plurality of storage nodes from the first storage class to the second storage class; and reserving compute capacity to instantiate at least one storage node of the first storage class in response to reconfiguring the second plurality of storage nodes.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
    determining, by a processing device, that a projected storage demand factor of a plurality of storage nodes is lower than a current storage demand factor of the plurality of storage nodes;
    responsive to determining that the projected storage demand factor is lower than the current storage demand factor, requesting termination of a first storage node of the plurality of storage nodes; and
    canceling termination of the first storage node based on an association between the first storage node and a second storage node.

2. The method of claim 1, further comprising:
    terminating a third storage node in response to canceling termination of the first storage node.

3. The method of claim 1, further comprising:
    selecting the first storage node for termination, wherein, after the first storage node is selected for termination, a higher level authoritative system performs a validation procedure to check consequences for other systems from terminating the first storage node.

4. The method of claim 1, wherein, instead of terminating the first storage node, an alternative deprovisioning method is implemented.

5. The method of claim 4, wherein the alternative deprovisioning method is at least one of reducing at least one performance setting or migrating the first storage node.

6. The method of claim 1, wherein the processing device has access to storage utilization data across at least one of geographic regions and time zones collected by a plurality of orchestrators.

7. The method of claim 1, further comprising:
    tracking persistent volume claims from service guests instantiated for a tenant.

8. The method of claim 1, wherein a storage container measures input output operations per second of the first storage node.

9. The method of claim 1, further comprising:
    implementing timers to measure response times to storage requests, wherein rolling averages for storage latency are tracked by a memory management unit.

10. The method of claim 1, wherein, during a migration, writes to the first storage node are paused and buffered.

11. The method of claim 1, wherein a third storage node is migrated from a first storage container to a second storage container without a physical data transfer by modifying at least one of memory paging or virtual linking.

12. The method of claim 1, further comprising:
    recalibrating storage capacity deprovisioning as a periodic job.

13. The method of claim 1, wherein a termination request for a service container triggers an audit of deprovisionable or terminable dependencies of the service container.

14. A system comprising:
    a processing device configured to manage a first plurality of storage nodes by executing to:
    determine that a projected storage demand factor of the first plurality of storage nodes is lower than a current storage demand factor of the first plurality of storage nodes;
    responsive to determining that the projected storage demand factor is lower than the current storage demand factor, request termination of a first storage node of the first plurality of storage nodes; and
    cancel termination of the first storage node based on an association between the first storage node and a second storage node.

15. The system of claim 14, wherein the first plurality of storage nodes is hosted on a plurality of storage guests, including a first storage guest hosting the first storage node and a second storage guest hosting the second storage node,
    wherein the first storage node becomes associated with a third storage guest, and the first storage guest is terminated after the first storage node becomes associated with the third storage guest,
    wherein a second plurality of storage nodes is associated with a second plurality of storage guests, and the third storage guest is a guest of the second plurality of storage guests, and
    wherein a third storage node is hosted on both the third storage guest and a fourth storage guest.

16. The system of claim 14, wherein the plurality of service guests is associated with a first tenant and a second plurality of service guests is associated with a second tenant, a first timing factor applies to the first tenant, and a different second timing factor applies to the second tenant, and
    wherein the first timing factor includes at least one of a cyclical demand and a currently unfulfilled demand.

17. The system of claim 14, wherein instead of terminating the first storage node, an alternative deprovisioning method is implemented, which improves at least one of a computing efficiency, an energy efficiency, or a guest density of physical computing hardware compared with shutting down the first storage node.

18. The system of claim 14, wherein a first storage class associated with the plurality of service guests includes at least two settings of a replication setting, an input/output setting, a capacity setting, a network setting, or a zone setting,
    wherein a second storage class replaces at least one setting of the first storage class with a lower performance setting, and a third storage node of the first plurality of storage nodes is reconfigured from the first storage class to the second storage class, and wherein the third storage node is reconfigured based on a measured usage criteria of the third storage node.

19. The system of claim 14, wherein a third storage node of the first plurality of storage nodes is instantiated in a storage guest based on determining that the projected storage demand factor is higher than the current storage demand factor.

20. A method comprising:

determining that a first plurality of storage nodes is overprovisioned;

determining to deprovision a first storage node of the first plurality of storage nodes; and deprovisioning the first storage node by reconfiguring the first storage node from a first storage class to a second storage class, wherein deprovisioning of a second storage node of the first plurality of storage nodes is canceled based on an association between the second storage node and a third storage node, and wherein the third storage node is a storage node of a different second plurality of storage nodes associated with a second plurality of service guests and the third storage node is not a member of the first plurality of storage nodes.

* * * * *

UNITED STATES PATENT AND TRADEMARK OFFICE
CERTIFICATE OF CORRECTION

| | |
|---|---|
| PATENT NO. | : 11,567,677 B2 |
| APPLICATION NO. | : 17/575869 |
| DATED | : January 31, 2023 |
| INVENTOR(S) | : Huamin Chen et al. |

It is certified that error appears in the above-identified patent and that said Letters Patent is hereby corrected as shown below:

In the Specification

In Column 6, Lines 39-40, replace "virtual memory devices ("VIVID") 192A," with -- virtual memory devices ("VMD") 192A, --.

In Column 6, Line 47, replace "VIVID" with -- VMD --.

In Column 9, Line 49, replace "storage 10 throughput" with -- storage IO throughput --.

In Column 12, Line 50, replace "TOPS" with -- IOPS --.

In Column 12, Line 52, replace "TOPS" with -- IOPS --.

In Column 15, Line 29, replace "TOPS" with -- IOPS --.

Signed and Sealed this
Twenty-sixth Day of March, 2024

Katherine Kelly Vidal
*Director of the United States Patent and Trademark Office*